United States Patent
Von Bueren et al.

(10) Patent No.: US 11,280,803 B2
(45) Date of Patent: Mar. 22, 2022

(54) SLIDE MANAGEMENT SYSTEM

(71) Applicant: Sakura Finetek U.S.A., Inc., Torrance, CA (US)

(72) Inventors: Erico Von Bueren, Rolling Hills Estates, CA (US); Ralf Van Den Berg, The Hague (NL)

(73) Assignee: SAKURA FINETEK U.S.A., INC., Torrance, CA (US)

( * ) Notice: Subject to any disclaimer, the term of this patent is extended or adjusted under 35 U.S.C. 154(b) by 111 days.

(21) Appl. No.: 15/359,484

(22) Filed: Nov. 22, 2016

(65) Prior Publication Data

US 2018/0143214 A1 May 24, 2018

(51) Int. Cl.
*G02B 21/34* (2006.01)
*H04N 5/247* (2006.01)
(Continued)

(52) U.S. Cl.
CPC . *G01N 35/00029* (2013.01); *G01N 35/00603* (2013.01); *G02B 21/002* (2013.01);
(Continued)

(58) Field of Classification Search
CPC ....... G01N 35/00029; G01N 35/00603; G01N 2035/00039; G02B 21/002; G02B 21/34;
(Continued)

(56) References Cited

U.S. PATENT DOCUMENTS 2,051,051 A   8/1936   Lilienfeld
3,309,262 A   3/1967   Copeland et al.
(Continued)

FOREIGN PATENT DOCUMENTS

CA   2504245   11/2006
CN   102565428 A   7/2012
(Continued)

OTHER PUBLICATIONS

Sakura Finetek U.S.A., Inc., "Final Office Action", U.S. Appl. No. 14/138,740, (dated Jan. 26, 2017).
(Continued)

*Primary Examiner* — Jae N Noh
(74) *Attorney, Agent, or Firm* — William Thomas Babbitt, Esq.; Leech Tishman Fuscaldo & Lampl

(57) ABSTRACT

An apparatus including a first and a second imaging module; a storage module; an automated transport module operable to transport at least one slide; and a controller operable to direct transport of the at least one slide by the transport module into the first imaging module and into the second imaging module. A method and a machine-readable medium including program instructions to cause a controller to perform a method including transporting at least one slide to a first imaging module using an automated transport module; capturing by the first imaging module of an image of a specimen on the at least one slide; transporting the at least one slide to a storage module using the automated transport module; and transporting the at least one slide to a second imaging module in response to a request for capturing an image in addition to the image captured by the first imaging module.

16 Claims, 9 Drawing Sheets

(51) Int. Cl.
  *G01N 35/00* (2006.01)
  *G02B 21/00* (2006.01)
  *G02B 21/36* (2006.01)
  *G06T 7/00* (2017.01)

(52) U.S. Cl.
  CPC ........... *G02B 21/34* (2013.01); *G02B 21/365* (2013.01); *G02B 21/368* (2013.01); *G06T 7/0012* (2013.01); *H04N 5/247* (2013.01); *G01N 2035/00039* (2013.01); *G06T 2207/10056* (2013.01); *G06T 2207/30024* (2013.01)

(58) Field of Classification Search
  CPC .. G02B 21/365; G02B 21/368; G06T 7/0012; G06T 2207/10056; G06T 2207/30024; H04N 5/247
  USPC .......................................................... 348/79
  See application file for complete search history.

(56) References Cited

U.S. PATENT DOCUMENTS

| | | | |
|---|---|---|---|
| 3,525,803 A | 8/1970 | Smart | |
| 3,762,798 A | 10/1973 | Grubb et al. | |
| 3,765,851 A | 10/1973 | White | |
| 3,862,909 A | 1/1975 | Copeland | |
| 4,000,417 A | 12/1976 | Adkisson et al. | |
| 4,079,248 A | 3/1978 | Lehureau et al. | |
| 4,089,989 A | 5/1978 | White et al. | |
| 4,148,752 A | 4/1979 | Burger et al. | |
| 4,404,683 A | 9/1983 | Kobayashi et al. | |
| 4,477,185 A | 10/1984 | Berger et al. | |
| 4,595,829 A | 6/1986 | Neumann et al. | |
| 4,673,988 A | 6/1987 | Jansson et al. | |
| 4,684,799 A | 8/1987 | Emoto et al. | |
| 4,737,022 A | 4/1988 | Faltermeier et al. | |
| 4,760,385 A | 7/1988 | Jansson et al. | |
| 4,761,075 A | 8/1988 | Matsushita et al. | |
| 4,836,667 A | 6/1989 | Ozeki | |
| 4,849,177 A | 7/1989 | Jordan | |
| 4,958,920 A | 9/1990 | Jorgens et al. | |
| 4,962,264 A | 10/1990 | Forester | |
| 5,180,606 A | 1/1993 | Stokes et al. | |
| 5,287,272 A | 2/1994 | Rutenberg et al. | |
| 5,297,034 A | 3/1994 | Weinstien | |
| 5,297,215 A | 3/1994 | Yamagishi | |
| 5,311,426 A | 5/1994 | Donohue et al. | |
| 5,367,401 A | 11/1994 | Saulietis | |
| 5,428,690 A | 6/1995 | Bacus et al. | |
| 5,473,706 A | 12/1995 | Bacus et al. | |
| 5,530,237 A | 6/1996 | Sato et al. | |
| 5,532,874 A | 7/1996 | Stein | |
| 5,546,323 A | 8/1996 | Bacus et al. | |
| 5,561,556 A | 10/1996 | Weissman et al. | |
| 5,581,637 A | 12/1996 | Cass et al. | |
| 5,655,028 A | 8/1997 | Soll et al. | |
| 5,659,174 A | 8/1997 | Kaneoka et al. | |
| 5,675,141 A | 10/1997 | Kukihara | |
| 5,686,960 A | 11/1997 | Sussman et al. | |
| 5,696,589 A | 12/1997 | Bernacki | |
| 5,737,084 A | 4/1998 | Ishihara | |
| 5,768,033 A | 6/1998 | Brock | |
| 5,793,969 A | 8/1998 | Kamentsky et al. | |
| 5,836,877 A | 11/1998 | Zavislan | |
| 5,864,138 A | 1/1999 | Miyata et al. | |
| 5,891,619 A | 4/1999 | Zakim et al. | |
| 5,924,074 A | 6/1999 | Evans | |
| 5,947,167 A | 9/1999 | Bogen et al. | |
| 6,008,892 A | 12/1999 | Kain et al. | |
| 6,031,930 A | 2/2000 | Bacus et al. | |
| 6,043,475 A | 3/2000 | Shimada et al. | |
| 6,061,176 A | 5/2000 | Shih | |
| 6,078,681 A | 6/2000 | Silver | |
| 6,091,075 A | 7/2000 | Shibata et al. | |
| 6,091,842 A | 7/2000 | Domanik et al. | |
| 6,101,265 A | 8/2000 | Bacus et al. | |
| 6,130,745 A | 10/2000 | Manian et al. | |
| 6,147,797 A | 11/2000 | Lee | |
| 6,205,235 B1 | 3/2001 | Roberts | |
| 6,208,374 B1 | 3/2001 | Clinch | |
| 6,215,892 B1 | 4/2001 | Douglass et al. | |
| 6,226,352 B1 | 5/2001 | Salb | |
| 6,226,392 B1 | 5/2001 | Bacus et al. | |
| 6,248,995 B1 | 6/2001 | Tanaami et al. | |
| 6,272,235 B1 | 8/2001 | Bacus et al. | |
| 6,309,607 B1 | 10/2001 | Johnston et al. | |
| 6,396,941 B1 | 5/2002 | Bacus et al. | |
| 6,404,906 B2 | 6/2002 | Bacus et al. | |
| 6,466,690 B2 | 10/2002 | Bacus et al. | |
| 6,522,774 B1 | 2/2003 | Bacus et al. | |
| 6,529,271 B1 | 3/2003 | Engelhardt | |
| 6,606,413 B1 | 8/2003 | Zeineh | |
| 6,671,393 B2 | 12/2003 | Hays et al. | |
| 6,674,881 B2 | 1/2004 | Bacus et al. | |
| 6,674,884 B2 | 1/2004 | Bacus et al. | |
| 6,678,398 B2 | 1/2004 | Wolters et al. | |
| 6,684,092 B2 | 1/2004 | Zavislan | |
| 6,711,283 B1 | 3/2004 | Soenksen | |
| 6,735,531 B2 | 5/2004 | Rhett et al. | |
| 6,745,916 B2 * | 6/2004 | Plank ................... | G01N 1/2813 221/1 |
| 6,775,402 B2 | 8/2004 | Bacus et al. | |
| 6,800,249 B2 | 10/2004 | de la Torre-Bueno | |
| 6,800,853 B2 | 10/2004 | Ohkura | |
| 6,812,446 B2 | 11/2004 | Kreh | |
| 6,834,237 B2 | 12/2004 | Noergaard et al. | |
| 6,838,650 B1 | 1/2005 | Toh | |
| 6,847,481 B1 | 1/2005 | Ludl et al. | |
| 6,847,729 B1 | 1/2005 | Clinch et al. | |
| 6,947,583 B2 | 9/2005 | Ellis et al. | |
| 6,959,720 B2 | 11/2005 | Kurihara et al. | |
| 6,982,741 B2 | 1/2006 | Fiedler | |
| 6,993,169 B2 | 1/2006 | Wetzel et al. | |
| 7,009,638 B2 | 3/2006 | Gruber et al. | |
| 7,016,109 B2 | 3/2006 | Nakagawa | |
| 7,027,627 B2 | 4/2006 | Levin et al. | |
| 7,031,507 B2 | 4/2006 | Bacus et al. | |
| 7,071,969 B1 | 7/2006 | Stimson | |
| 7,098,634 B1 | 8/2006 | Yu | |
| 7,110,586 B2 | 9/2006 | Bacus et al. | |
| 7,110,645 B2 | 9/2006 | Birk et al. | |
| 7,133,545 B2 | 11/2006 | Douglass et al. | |
| 7,136,518 B2 | 11/2006 | Griffin et al. | |
| 7,141,802 B2 | 11/2006 | Takeyama et al. | |
| 7,146,372 B2 | 12/2006 | Bacus et al. | |
| 7,149,332 B2 | 12/2006 | Bacus et al. | |
| 7,171,030 B2 | 1/2007 | Foran et al. | |
| 7,194,118 B1 | 3/2007 | Harris et al. | |
| 7,196,300 B2 | 3/2007 | Watkins et al. | |
| 7,209,287 B2 | 4/2007 | Lauer | |
| 7,212,660 B2 | 5/2007 | Wetzel et al. | |
| 7,224,839 B2 | 5/2007 | Zeineh | |
| 7,233,340 B2 | 6/2007 | Hughes et al. | |
| 7,248,403 B2 | 7/2007 | Nakagawa | |
| 7,250,963 B2 | 7/2007 | Yuri et al. | |
| 7,292,251 B1 | 11/2007 | Gu | |
| 7,297,910 B2 | 11/2007 | Fomitchov | |
| 7,301,133 B2 | 11/2007 | Weiss | |
| 7,349,482 B2 | 3/2008 | Kim | |
| 7,359,548 B2 | 4/2008 | Douglass et al. | |
| 7,391,894 B2 | 6/2008 | Zeineh | |
| 7,394,482 B2 | 7/2008 | Olschewski | |
| 7,394,979 B2 | 7/2008 | Luther et al. | |
| 7,396,508 B1 | 7/2008 | Richards et al. | |
| 7,400,342 B2 | 7/2008 | Gaida et al. | |
| 7,400,983 B2 | 7/2008 | Feingold et al. | |
| 7,406,215 B2 | 7/2008 | Clune et al. | |
| 7,421,102 B2 | 9/2008 | Wetzel et al. | |
| 7,426,345 B2 | 9/2008 | Takamatsu et al. | |
| 7,428,325 B2 | 9/2008 | Douglass et al. | |
| 7,433,026 B2 | 10/2008 | Wolpert et al. | |
| 7,456,377 B2 | 11/2008 | Zeineh et al. | |
| 7,463,761 B2 | 12/2008 | Eichhorn et al. | |

(56) References Cited

U.S. PATENT DOCUMENTS

| | | |
|---|---|---|
| 7,470,541 B2 | 12/2008 | Copeland et al. |
| 7,482,600 B2 | 1/2009 | Seyfried |
| 7,483,554 B2 | 1/2009 | Kotsianti et al. |
| 7,486,329 B2 | 2/2009 | Endo |
| 7,502,519 B2 | 3/2009 | Eichhorn et al. |
| 7,542,596 B2 | 6/2009 | Bacus et al. |
| 7,550,699 B1 | 6/2009 | Marshall |
| 7,584,019 B2 | 9/2009 | Feingold et al. |
| 7,596,249 B2 | 9/2009 | Bacus et al. |
| 7,602,524 B2 | 10/2009 | Eichhorn et al. |
| 7,623,697 B1 | 11/2009 | Hughes et al. |
| 7,630,113 B2 | 12/2009 | Sase et al. |
| 7,633,616 B2 | 12/2009 | Hing |
| 7,642,093 B2 | 1/2010 | Tseung et al. |
| 7,653,300 B2 | 1/2010 | Fujiyoshi et al. |
| 7,657,070 B2 * | 2/2010 | Lefebvre ............... G01N 1/312 382/128 |
| 7,663,078 B2 | 2/2010 | Virag et al. |
| 7,677,289 B2 | 3/2010 | Hayworth et al. |
| 7,689,024 B2 | 3/2010 | Eichhorn et al. |
| 7,738,688 B2 | 6/2010 | Eichhorn et al. |
| 7,756,309 B2 | 7/2010 | Gholap et al. |
| 7,756,357 B2 | 7/2010 | Yoneyama |
| 7,778,485 B2 | 8/2010 | Zeineh et al. |
| 7,822,257 B2 | 10/2010 | Endo et al. |
| 7,840,300 B2 | 11/2010 | Harker |
| 7,856,131 B2 | 12/2010 | Bacus et al. |
| 7,860,292 B2 | 12/2010 | Eichhorn et al. |
| 7,864,414 B2 | 1/2011 | Sase et al. |
| 7,869,641 B2 | 1/2011 | Wetzel et al. |
| 7,873,193 B2 | 1/2011 | De La Torre-Bueno et al. |
| 7,876,948 B2 | 1/2011 | Wetzel et al. |
| RE42,220 E | 3/2011 | Clinch et al. |
| 7,901,941 B2 | 3/2011 | Tseung et al. |
| 7,912,267 B2 | 3/2011 | Kawano et al. |
| 7,916,916 B2 | 3/2011 | Zeineh |
| 7,920,163 B1 | 4/2011 | Kossin |
| 7,925,067 B2 | 4/2011 | Bacus et al. |
| 7,944,608 B2 | 5/2011 | Hayashi et al. |
| 7,949,161 B2 | 5/2011 | Kawanabe et al. |
| 7,957,057 B2 | 6/2011 | Sase et al. |
| 7,967,057 B2 | 6/2011 | Kunii et al. |
| 7,978,894 B2 | 7/2011 | Soenksen et al. |
| 8,000,560 B2 | 8/2011 | Shirota |
| 8,000,562 B2 | 8/2011 | Morales et al. |
| 8,036,868 B2 | 10/2011 | Zeineh et al. |
| 8,074,547 B2 | 12/2011 | Ito et al. |
| 8,077,959 B2 | 12/2011 | Dekel et al. |
| 8,085,296 B2 | 12/2011 | Yuguchi et al. |
| 8,094,902 B2 | 1/2012 | Crandall et al. |
| 8,094,914 B2 | 1/2012 | Iki et al. |
| 8,098,279 B2 | 1/2012 | Sase et al. |
| 8,098,956 B2 | 1/2012 | Tatke et al. |
| 8,103,082 B2 | 1/2012 | Olson et al. |
| 8,125,534 B2 | 2/2012 | Shimonaka |
| 8,159,547 B2 | 4/2012 | Kawashima |
| 8,174,763 B2 | 5/2012 | Guiney et al. |
| 8,187,536 B2 | 5/2012 | Graupner et al. |
| 8,199,358 B2 | 6/2012 | Eichhorn et al. |
| 8,203,575 B2 | 6/2012 | Molnar et al. |
| 8,283,176 B2 | 10/2012 | Bland et al. |
| 8,304,704 B2 | 11/2012 | Hing et al. |
| 8,305,434 B2 | 11/2012 | Nakatsuka et al. |
| 8,306,298 B2 | 11/2012 | Bacus et al. |
| 8,306,300 B2 | 11/2012 | Bacus et al. |
| 8,339,703 B2 | 12/2012 | Knebel |
| 8,350,904 B2 | 1/2013 | Fujimoto et al. |
| 8,366,857 B2 | 2/2013 | Hayworth et al. |
| 8,385,619 B2 | 2/2013 | Soenksen |
| 8,385,686 B2 | 2/2013 | Sano |
| 8,388,891 B2 * | 3/2013 | Lefebvre ............... G01N 1/312 422/65 |
| 8,394,635 B2 | 3/2013 | Key et al. |
| 8,396,669 B2 | 3/2013 | Cocks |
| 8,463,741 B2 | 6/2013 | Ehlke et al. |
| 8,473,035 B2 | 6/2013 | Frangioni |
| 8,476,585 B2 | 7/2013 | Galloway |
| 8,501,435 B2 | 8/2013 | Gustafsson et al. |
| 8,565,480 B2 | 10/2013 | Eichhorn et al. |
| 8,565,503 B2 | 10/2013 | Eichhorn et al. |
| 8,582,489 B2 | 11/2013 | Eichhorn et al. |
| 8,582,849 B2 | 11/2013 | Eichhorn et al. |
| 8,673,642 B2 | 3/2014 | Key et al. |
| 8,687,858 B2 | 4/2014 | Walter et al. |
| 8,725,237 B2 | 5/2014 | Bryant-Greenwood et al. |
| 8,730,315 B2 | 5/2014 | Yoneyama |
| 8,744,213 B2 | 6/2014 | Tatke et al. |
| 8,747,746 B2 | 6/2014 | Lefebvre |
| 8,771,978 B2 | 7/2014 | Ragan |
| 8,788,217 B2 | 7/2014 | Feingold et al. |
| 8,796,038 B2 | 8/2014 | Williamson, IV et al. |
| 8,827,760 B2 | 9/2014 | Ushibo et al. |
| 8,923,597 B2 | 12/2014 | Eichhorn et al. |
| 9,310,598 B2 | 4/2016 | Hing et al. |
| 2001/0035752 A1 | 11/2001 | Kormos et al. |
| 2002/0169512 A1 | 11/2002 | Stewart |
| 2002/0176160 A1 | 11/2002 | Suzuki et al. |
| 2002/0176161 A1 | 11/2002 | Yoneyama et al. |
| 2003/0048931 A1 | 3/2003 | Johnson et al. |
| 2003/0098921 A1 | 5/2003 | Endo |
| 2003/0112330 A1 | 6/2003 | Yuri et al. |
| 2003/0112504 A1 | 6/2003 | Czarnetzki et al. |
| 2003/0124729 A1 | 7/2003 | Christensen et al. |
| 2003/0133009 A1 | 7/2003 | Brown |
| 2003/0142882 A1 | 7/2003 | Beged-Dov et al. |
| 2003/0156276 A1 | 8/2003 | Bowes |
| 2004/0021936 A1 | 2/2004 | Czarnetzki et al. |
| 2004/0027462 A1 | 2/2004 | Hing |
| 2004/0080758 A1 | 4/2004 | Ban et al. |
| 2004/0090667 A1 | 5/2004 | Gartner et al. |
| 2004/0113043 A1 | 6/2004 | Ishikawa et al. |
| 2004/0129858 A1 | 7/2004 | Czarnetzki et al. |
| 2004/0135061 A1 | 7/2004 | Kreh |
| 2004/0141660 A1 | 7/2004 | Barth et al. |
| 2005/0057812 A1 | 3/2005 | Raber |
| 2005/0073649 A1 | 4/2005 | Spector |
| 2005/0090017 A1 | 4/2005 | Morales |
| 2005/0094262 A1 | 5/2005 | Spediacci et al. |
| 2005/0112537 A1 | 5/2005 | Wu |
| 2005/0211874 A1 | 9/2005 | Takeyama et al. |
| 2005/0219688 A1 | 10/2005 | Kawano et al. |
| 2005/0221351 A1 | 10/2005 | Jekwam |
| 2005/0239113 A1 | 10/2005 | Ryu et al. |
| 2005/0248837 A1 | 11/2005 | Sase |
| 2005/0258335 A1 | 11/2005 | Oshiro et al. |
| 2006/0039583 A1 | 2/2006 | Bickert et al. |
| 2006/0045388 A1 | 3/2006 | Zeineh |
| 2006/0077536 A1 | 4/2006 | Bromage et al. |
| 2006/0088940 A1 | 4/2006 | Feingold et al. |
| 2006/0098861 A1 | 5/2006 | See et al. |
| 2006/0146283 A1 | 7/2006 | Baumann et al. |
| 2006/0164623 A1 | 7/2006 | Wagner et al. |
| 2006/0171560 A1 | 8/2006 | Manus |
| 2006/0179992 A1 | 8/2006 | Kermani |
| 2007/0025606 A1 | 2/2007 | Gholap et al. |
| 2007/0091324 A1 | 4/2007 | Paul et al. |
| 2007/0098237 A1 | 5/2007 | Yoo et al. |
| 2007/0102620 A1 | 5/2007 | Bublitz et al. |
| 2007/0164194 A1 | 7/2007 | Kurata et al. |
| 2007/0198001 A1 | 8/2007 | Bauch et al. |
| 2007/0206096 A1 | 9/2007 | Cooke et al. |
| 2007/0207061 A1 | 9/2007 | Yang et al. |
| 2007/0224699 A1 | 9/2007 | Gates |
| 2007/0285768 A1 | 12/2007 | Kawanabe et al. |
| 2008/0002252 A1 | 1/2008 | Weiss et al. |
| 2008/0020128 A1 | 1/2008 | van Ryper et al. |
| 2008/0054156 A1 | 3/2008 | Fomitchov |
| 2008/0095424 A1 | 4/2008 | Iki et al. |
| 2008/0095467 A1 | 4/2008 | Olszak et al. |
| 2008/0142708 A1 | 6/2008 | Workman et al. |
| 2008/0180794 A1 | 7/2008 | Tafas et al. |
| 2008/0240613 A1 | 10/2008 | Dietz et al. |
| 2008/0283722 A1 | 11/2008 | Uchiyama et al. |
| 2009/0040322 A1 | 2/2009 | Leberl et al. |

(56) References Cited

U.S. PATENT DOCUMENTS

| | | |
|---|---|---|
| 2009/0046298 A1 | 2/2009 | Betzig |
| 2009/0116101 A1 | 5/2009 | Tafas et al. |
| 2009/0140169 A1 | 6/2009 | Niehren |
| 2009/0195688 A1 | 8/2009 | Henderson |
| 2010/0000383 A1 | 1/2010 | Koos et al. |
| 2010/0020157 A1 | 1/2010 | Jelinek et al. |
| 2010/0039507 A1 | 2/2010 | Imade |
| 2010/0074489 A1 | 3/2010 | Bacus et al. |
| 2010/0093022 A1 | 4/2010 | Hayworth et al. |
| 2010/0102571 A1 | 4/2010 | Yang |
| 2010/0109725 A1 | 5/2010 | Yun et al. |
| 2010/0118133 A1 | 5/2010 | Walter et al. |
| 2010/0118393 A1 | 5/2010 | Lin |
| 2010/0134655 A1 | 6/2010 | Kuroiwa |
| 2010/0141751 A1 | 6/2010 | Uchida |
| 2010/0141752 A1 | 6/2010 | Yamada |
| 2010/0141753 A1 | 6/2010 | Olson et al. |
| 2010/0171809 A1 | 7/2010 | Fujiyoshi |
| 2010/0177166 A1 | 7/2010 | Eichhorn et al. |
| 2010/0188738 A1 | 7/2010 | Epple et al. |
| 2010/0194873 A1 | 8/2010 | Viereck et al. |
| 2010/0201800 A1 | 8/2010 | Yamamoto et al. |
| 2010/0225668 A1 | 9/2010 | Tatke et al. |
| 2010/0260407 A1 | 10/2010 | Eichhorn et al. |
| 2010/0279342 A1 | 11/2010 | Kijima et al. |
| 2010/0295932 A1 | 11/2010 | Yakomachi et al. |
| 2010/0310139 A1 | 12/2010 | Kimura |
| 2011/0017902 A1 | 1/2011 | Hing et al. |
| 2011/0037847 A1 | 2/2011 | Soenksen |
| 2011/0038523 A1 | 2/2011 | Boardman |
| 2011/0043663 A1 | 2/2011 | Tsuchiya |
| 2011/0064296 A1 | 3/2011 | Dixon |
| 2011/0074817 A1 | 3/2011 | Shinichi et al. |
| 2011/0102571 A1 | 5/2011 | Yoneyama |
| 2011/0109735 A1 | 5/2011 | Otsuka |
| 2011/0145755 A1 | 6/2011 | Bacus et al. |
| 2011/0181622 A1 | 7/2011 | Bacus et al. |
| 2011/0221881 A1 | 9/2011 | Shirota et al. |
| 2011/0316993 A1 | 12/2011 | Chen et al. |
| 2011/0316999 A1 | 12/2011 | Yoneyama et al. |
| 2012/0002043 A1 | 1/2012 | Nitta |
| 2012/0002892 A1 | 1/2012 | Eichhorn et al. |
| 2012/0038979 A1 | 2/2012 | Hing et al. |
| 2012/0044342 A1 | 2/2012 | Hing et al. |
| 2012/0069171 A1 | 3/2012 | Kodaira et al. |
| 2012/0069344 A1 | 3/2012 | Liu |
| 2012/0076391 A1 | 3/2012 | Dietz et al. |
| 2012/0076411 A1 | 3/2012 | Dietz et al. |
| 2012/0076436 A1 | 3/2012 | Dietz et al. |
| 2012/0081536 A1 | 4/2012 | Kuppig et al. |
| 2012/0114204 A1 | 5/2012 | Olson et al. |
| 2012/0120225 A1 | 5/2012 | Maddison |
| 2012/0127297 A1 | 5/2012 | Baxi et al. |
| 2012/0163680 A1 | 6/2012 | Lefebvre |
| 2012/0208184 A1 | 8/2012 | Ragan |
| 2012/0281931 A1 | 11/2012 | Eichhorn et al. |
| 2013/0003172 A1 | 1/2013 | Widzgowski et al. |
| 2013/0076886 A1 | 3/2013 | Ikeno et al. |
| 2013/0140459 A1 | 6/2013 | Galloway |
| 2013/0162802 A1 | 6/2013 | Soenksen |
| 2013/0164781 A1 | 6/2013 | Lefebvre |
| 2013/0182922 A1 | 7/2013 | Kil |
| 2013/0216451 A1 | 8/2013 | Hayworth et al. |
| 2013/0250090 A1 | 9/2013 | Morimoto |
| 2014/0030757 A1 | 1/2014 | Schiffenbauer |
| 2014/0049632 A1 | 2/2014 | Hemmer |
| 2014/0051158 A1 | 2/2014 | Nakajima et al. |
| 2014/0085453 A1 | 3/2014 | Yamane |
| 2014/0086463 A1 | 3/2014 | Meetz et al. |
| 2014/0087411 A1 | 3/2014 | Chow et al. |
| 2014/0098376 A1 | 4/2014 | Hashimshony et al. |
| 2014/0112560 A1 | 4/2014 | Soenksen |
| 2014/0118528 A1 | 5/2014 | Wolff et al. |
| 2014/0130613 A1 | 5/2014 | Adiga et al. |
| 2014/0137715 A1 | 5/2014 | Sneyders et al. |
| 2014/0273086 A1 | 9/2014 | Lefebvre |
| 2015/0015578 A1 | 1/2015 | Eichhorn et al. |
| 2015/0153552 A1 | 6/2015 | Loney et al. |
| 2015/0153555 A1 | 6/2015 | Loney et al. |
| 2015/0153556 A1 | 6/2015 | Loney et al. |
| 2015/0177504 A1 | 6/2015 | Bickert |

FOREIGN PATENT DOCUMENTS

| | | |
|---|---|---|
| CN | 102782557 | 11/2012 |
| CN | 102841079 | 12/2012 |
| DE | 102009012293 | 3/2009 |
| EP | 1447699 | 8/2004 |
| EP | 2051051 | 4/2009 |
| EP | 2169379 | 3/2010 |
| ER | 2110696 | 10/2009 |
| FR | 2620537 | 3/1989 |
| GB | 03092 | 11/1906 |
| JP | 59071018 | 4/1984 |
| JP | 61248168 | 11/1986 |
| JP | S63206793 | 8/1988 |
| JP | 1992335787 A | 11/1992 |
| JP | 09080138 | 3/1997 |
| JP | 09133856 | 5/1997 |
| JP | 9161068 | 6/1997 |
| JP | 09218354 | 8/1997 |
| JP | 2000055635 A | 2/2000 |
| JP | 2001281553 | 10/2001 |
| JP | 2002-031513 A | 1/2002 |
| JP | 200284554 | 3/2002 |
| JP | 2003248176 A | 9/2003 |
| JP | 2006003543 | 1/2006 |
| JP | 2006220654 A | 8/2006 |
| JP | 2006292999 A | 10/2006 |
| JP | 2006343595 | 12/2006 |
| JP | 2007516447 A | 6/2007 |
| JP | 2007233093 A | 9/2007 |
| JP | 2009192824 | 2/2008 |
| JP | 2008262100 | 10/2008 |
| JP | 2009-036969 A | 2/2009 |
| JP | 2011008245 | 1/2011 |
| JP | 2011008397 A | 1/2011 |
| JP | 2011232762 A | 11/2011 |
| JP | 2012085252 A | 4/2012 |
| JP | 2012141287 A | 7/2012 |
| TW | 201201392 | 1/2012 |
| WO | WO-0154052 | 7/2001 |
| WO | WO-2005015120 | 2/2005 |
| WO | 2006028439 A1 | 3/2006 |
| WO | WO-2008118886 | 10/2008 |
| WO | WO-2008141009 | 11/2008 |
| WO | WO-2010105015 | 9/2010 |
| WO | WO-2012/024627 | 2/2012 |

OTHER PUBLICATIONS

Sakura Finetek U.S.A., Inc., "First Office Action", EP Application No. 15194968.2, (dated Mar. 10, 2017).

Sakura Finetek USA Inc., "Office Action", EP Application No. 15154503.5, (dated Feb. 28, 2017).

Requirement for Restriction/Election dated Nov. 3, 2014 for U.S. Appl. No. 13/255,827.

Office Action received for Japanese Patent Application No. 2016-507909, dated Apr. 28, 2017.

Office Action received for European Patent Application No. 14784707.3, dated Mar. 5, 2018.

Office Action received for Eurasian Patent Application No. 201001786, dated Jan. 21, 2014.

Office Action received for Chinese Patent Application No. 201480021837.2, dated Apr. 8, 2018.

Office Action received for Chinese Patent Application No. 201410415253.5, dated Feb. 9, 2018.

Office Action received for Canadian Patent Application No. 2908058, dated Jul. 24, 2017.

Office Action received for Canadian Patent Application No. 2808105, dated Jun. 12, 2017.

(56) References Cited

OTHER PUBLICATIONS

Notice of Allowance received for U.S. Appl. No. 14/138,740, dated Feb. 13, 2018.
Notice of Allowance and Fees Due (PTOL-85) dated Dec. 16, 2015 for U.S. Appl. No. 13/255,827.
Non-Final Office Action received for U.S. Appl. No. 14/779,550, dated Dec. 22, 2017.
Non-Final Office Action received for U.S. Appl. No. 13/212,955, dated Aug. 9, 2017.
International Search Report and Written Opinion received for PCT Patent Application No. PCT/IB2010/000518, dated Jul. 16, 2010, 16 pages (8 pages of English Translation and 8 pages of Original Document).
Final Office Action received for U.S. Appl. No. 14/779,550, dated May 24, 2017.
Final Office Action received for U.S. Appl. No. 14/138,740, dated Jun. 20, 2017.
Extended European Search Report and Written Opinion received for EP Patent Application No. 17202516, dated Apr. 24, 2018.
Forrest, K., et al., "Tunneling calculations for GaAs—AlxGa(1-x)As graded band-gap sawtooth superlattices", IEEE Journal of Quantum Electronics, vol. 26, No. 6, (Jun. 1990), 1067-1074.
Haruhisa, S., et al., "Application of telepathology for improvement of therapeutic effects and economic efficiency, and development of new equipment for it", Science Links Japan; http://sciencelinks.jp/j-east/article/200516/000020051605A0431066.php, Journal Code: N20051113, (2005), 166-125.
Sakura Finetek U.S.A., "Non-Final Office Action", U.S. Appl. No. 13/212,955, (dated May 3, 2016).
Sakura Finetek U.S.A., Inc., "Examination Report", AU Application No. 2011291517, (dated Dec. 24, 2013).
Sakura Finetek U.S.A., Inc., "Examination Report", AU Application No. 2011291517, (dated Jun. 19, 2014).
Sakura Finetek U.S.A., Inc., et al., "Examination Report", AU Application No. 2011291517, (dated Feb. 2, 2015).
Sakura Finetek U.S.A., Inc., et al., "Examiner's Report", CA Application No. 2,755,164, (dated Dec. 7, 2012).
Sakura Finetek U.S.A., Inc., "Extended European Search Report", EP Application No. 15194968.2, (dated Mar. 18, 2016).
Sakura Finetek U.S.A., Inc., "Extended Search Report", EP Application No. 15154503, (dated Jun. 19, 2015).
Sakura Finetek U.S.A., Inc., "Final Office Action", U.S. Appl. No. 13/212,955, (dated Apr. 15, 2015).
Sakura Finetek U.S.A., Inc., "Final Office Action", U.S. Appl. No. 13/255,827, (dated Oct. 20, 2015).
Sakura Finetek U.S.A., Inc., "Final Office Action", JP Application No. 2011-553548, (dated Sep. 2, 2014).
Sakura Finetek U.S.A., Inc., "Final Office Action", CN Application No. 201080017649,4, (dated Jul. 3, 2014).
Sakura Finetek U.S.A., Inc., et al., "International Preliminary Report on Patentability", International Application No. PCT/US2011/048488, (dated Mar. 7, 2013).
Sakura Finetek U.S.A., Inc., "International Search Report and Written Opinion", International Application No. PCT/US2011/048488, (dated Oct. 13, 2011).
Sakura Finetek U.S.A., Inc., "Non final office action", U.S. Appl. No. 14/138,740, (dated Jul. 1, 2016).
Sakura Finetek U.S.A., Inc., "Non-Final Office Action", U.S. Appl. No. 13/255,827, (dated Apr. 8, 2015).
Sakura Finetek U.S.A., Inc., "Non-Final Office Action", U.S. Appl. No. 13/212,955, (dated Oct. 31, 2014).
Sakura Finetek U.S.A., Inc., "Notice of rejection", JP Application No. 2013-525005, (dated Feb. 9, 2016).
Sakura Finetek U.S.A., Inc., et al., "Office Action", CN Application No. 201180047558.X, (dated Nov. 15, 2014).
Sakura Finetek U.S.A., Inc., et al., "Office Action", EP Application No. 11749675.2, (dated Jan. 30, 2015).
Sakura Finetek U.S.A., Inc., "Office Action", EP Application No. 10719379.9, (dated Jul. 30, 2013).
Sakura Finetek U.S.A., Inc., "Office Action", AU Application No. 2010222633, (dated Nov. 26, 2013).
Sakura Finetek U.S.A., Inc., "Office Action", JP Application No. P2011-553548, (dated Dec. 10, 2013).
Sakura Finetek U.S.A., Inc., "Partial Search Report", EP Application No. 14198636.4, (dated Apr. 28, 2015).
Sakura Finetek U.S.A., Inc., "PCT Search Report and Written Opinion", International Application No. PCT/US2014/034477, (dated Sep. 22, 2014).
Sakura Finetek U.S.A., Inc., "Second Office Action", EP Application No. 10719379.9, (dated Nov. 6, 2014).
Sakura Finetek U.S.A., Inc., "Second Office Action", CN Application No. 201080017649.4, (dated Dec. 27, 2013).
Sakura Finetek U.S.A., Inc., "Second office action", CN Application No. 201180047558.X, (dated Jul. 6, 2015).
Sakura Finetek U.S.A., Inc., "Third Office Action", CN Application No. 201180047558X, (dated Apr. 1, 2016).
Sakura Finetek USA, Inc., "Office Action", JP Application No. 2016-507909, (dated Sep. 15, 2016).
Sensovation AG, "International Preliminary Reporton Patentability", International Application No. PCT/IB2010/000518., (dated Sep. 20, 2011), 7 pages.
Sakura Finetek U.S.A., Inc., "Second Office Action", CN Application No. 2014800218372, dated Aug. 1, 2017.
Sakura Finetek U.S.A., "Extended Search Report", European Application No. 14198636, (dated Sep. 30, 2015).
Sakura Finetek U.S.A., Inc., "EP Supplementary Search Report", EP Application No. 14784707.3, (dated Oct. 4, 2016).
Sakura Finetek U.S.A., Inc., "Examination Report", CA Application No. 2908058, (dated Nov. 16, 2016).
Sakura Finetek U.S.A., Inc., "Final Rejection", JP Application No. P2013-525005, (dated Dec. 27, 2016).
Sakura Finetek U.S.A., Inc., "First Office Action with search report", CN Application No. 2014800218372, (dated Nov. 30, 2016).
Sakura Finetek U.S.A., Inc., "Fourth Office Action", CN Application No. 201180047558X, (dated Oct. 24, 2016).
Sakura Finetek U.S.A., Inc., "International Preliminary Report on Patentability", International Application No. PCT/US2014/034477, (dated Oct. 29, 2015).
Sakura Finetek U.S.A., Inc., "International Search Report and Written Opinion", International Application No. PCT/US2014/034477, (dated Sep. 22, 2014).
Sakura Finetek U.S.A., Inc., "Non-Final Office Action", U.S. Appl. No. 14/779,550, (dated Jan. 19, 2017).
Sakura Finetek U.S.A., Inc., "Patent Examination Report No. 1", AU Application No. 201453889, (dated May 18, 2016).
Sakura Finetek U.S.A., Inc., Related Application, European Patent Application No. 17202516.5, EPO Communication, dated May 28, 2018.
Sakura Finetek U.S.A., Inc., Related Application, Japanese Patent Application No. P2017-219675, Notice of Rejection, dated Jan. 22, 2019.
Sakura Finetek U.S.A., Inc., Related Application, Japanese Patent Application No. P2017-219675, Notice of Rejection, dated Sep. 3, 2019.
Sakura Finetek U.S.A., Inc., Related Application, Chinese Patent Application No. 201711081542.6, First Office Action, dated Apr. 16, 2020.
Sakura Finetek U.S.A., Inc., Related Application, Australian Patent Application No. 2019216682, Examination Report No. 1, dated May 1, 2020.
Sakura Finetek U.S.A., Inc., Related Application, Japanese Patent Application No. P2017-219675, Decision of Rejection, dated May 12, 2020.
Sakura Finetek U.S.A., Inc., Related Application, Australian Patent Application No. 2019216682, Examination Report No. 2, dated Jul. 10, 2020.
Sakura Finetek U.S.A., Inc., Related Application, European Patent Application No. 17202516.5, Communication pursuant to Article 94(3) EPC, dated Oct. 14, 2020.

(56) References Cited

OTHER PUBLICATIONS

Sakura Finetek U.S.A., Inc., Related Application, Chinese Patent Application No. 201711081542.6, Second Office Action, dated Dec. 3, 2020.
Sakura Finetek U.S.A., Inc., Related Application, Japanese Patent Application No. 2017-219675, Notice of Reasons for Refusal, dated Mar. 12, 2021.
Sakura Finetek U.S.A., Inc., Related Application, Chinese Patent Application No. 201111081542.6, Third Office Action , dated Jun. 2, 2021.

* cited by examiner

SLIDE MANAGEMENT SYSTEM

BACKGROUND

Field

An automated system of processing biological specimens.

Background

In various settings, examination of biological specimens is required for diagnostic purposes. Generally speaking, pathologists and other diagnosticians collect and study samples from patients, and utilize microscopic examination, and other devices to assess the samples at cellular levels. Numerous steps typically are involved in pathology and other diagnostic process, including the collection of biological samples such as blood and tissue, processing the samples, preparation of microscope slides, staining, examination, re-testing or re-staining, collecting additional samples, re-examination of the samples, and ultimately the offering of diagnostic findings. Numerous medical or veterinary personnel may be involved in the diagnostic processes, including surgeons, phlebotomists or other operating personnel collecting samples, pathologist, histologists and other personnel processing, transporting and examining the samples and so on. The complexity of the tissue handling procedures from the operating room to the laboratory and back to the diagnosticians or surgeons have become increasingly complex in large medical environments where high volumes of samples need to be handled, processed and examined on a daily basis.

Various steps of the tissue handling procedures have been automated using instruments each of which typically are controlled by a dedicated computer or an on-board computerized controller. In some laboratories, information can be shared between automated instruments and/or a networked laboratory or hospital information system, such as to store patient or tracking data. One example of an automated instrument is an automated tissue processing system in which biological samples are fixed and infiltrated with paraffin in an automated fashion. Exemplary tissue processing systems are the TISSUE-TEK® VIP® and the TISSUE-TEK® XPRESS® processing systems available from Sakura Finetek U.S.A., Inc. of Torrance, Calif.

Another example of automation is an automated slide stainer and coverslipper, which stains microscope slides and applies coverslips to the slides in an automated fashion. Examples of such automated staining and coverslipping systems are TISSUE-TEK® PRISMA® and TISSUE-TEK® FILM® combo system and TISSUE-TEK® PRISMA® and TISSUE-TEK® Glas™ g2 combo system available from Sakura Finetek U.S.A., Inc. of Torrance, Calif.

Despite the assistance of automated instruments, pathologists, other diagnosticians and laboratory personnel typically must be involved in numerous steps during the processing and examination of biological specimens. For example, once a specimen has been stained, the stained specimen on a microscope slide may be physically examined under a microscope. This typically involves transport of the microscope slide to a diagnostician who is located outside the laboratory, or in other cases may involve a diagnostician going to the laboratory to examine the microscope slide. Alternatively, the stained specimen on a microscope slide is imaged with a digital scanner and the image of the specimen is uploaded for examination by a diagnostician.

Following this initial examination step, the diagnostician generally evaluates whether additional testing is required. Such additional testing might involve collecting further specimens (samples) from a patient, or further examination of specimens already collected. For example, the diagnostician may retrieve the physical slide containing the specimen subject to the initial examination and examines the specimens using a traditional microscope. The diagnostician may also require that the existing specimen be sectioned further and a different staining regimen or other protocol be applied. This can result in iterations of one or more of collection, grossing, processing, infiltration, embedding, sectioning, coverslipping, staining, examination etc. In addition, different coverslipped slides may require different drying times. Accordingly, some slides may be ready for examination while others are not. All of this can result in time delays, as well as tissue impairment. Following the iterations of additional tests and procedures, the pathologist repeats the examination process, and may then request still further tests in an iterative fashion until an ultimate finding is reached.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
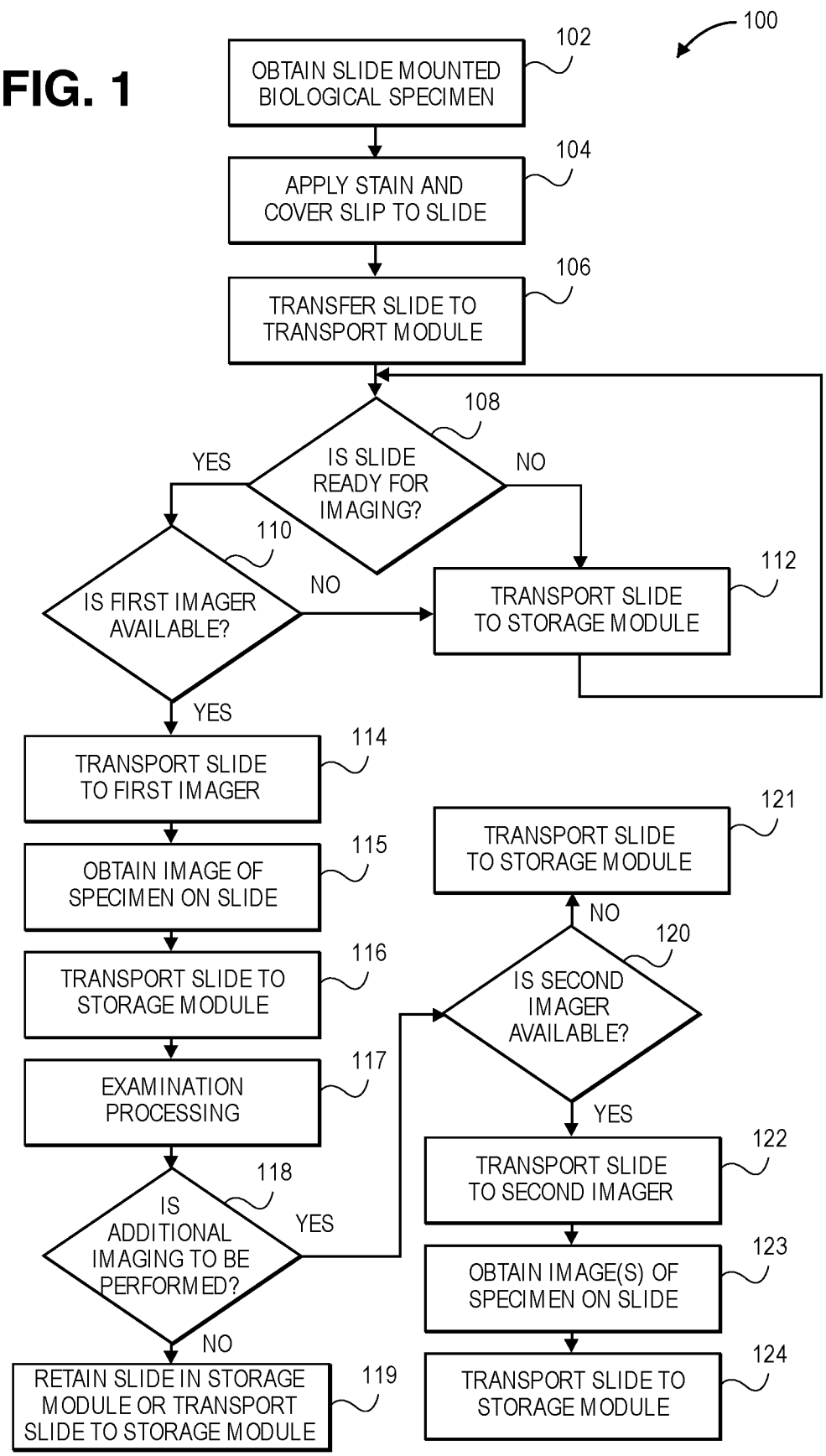
FIG. 1 is a flow chart of one embodiment of a method for automatically processing biological specimens.

In overview, a system (apparatus) and process for performing a series of automated operations including tissue processing, imaging and tissue storage is disclosed. FIG. 1 shows a flow chart of one embodiment of a process implemented by a system (i.e., machine-readable, non-transitory program instructions implemented in a processor connected to process control modules). Referring to FIG. 1, process 100 includes obtaining at a material handling system a biological sample that has been mounted on a slide (block 102). The biological sample is conveyed to a material handling system, for example, by manual transport, a cart or automated transport. In a hospital embodiment, the specimen may be delivered to a medical laboratory, whether on-site or at a remote location.

At the material handling system, the slide mounted specimen may be processed via automated operations into a condition suitable for a desired examination. In one embodiment, processing includes staining the biological sample and applying a cover slip to the slide (block 104). Staining of the specimen may be optional. The slide having the specimen thereon is then transferred to a transport module (block 106). In some embodiments, the slide is transferred to the transport module using a robotic transferring device as will be discussed in more detail with reference to FIGS. 4-9.

Process 100 also includes determining whether the slide is ready for imaging (block 108). Such a determination may be based on, for example, the drying time of the slide. For example, different methods of coverslipping exist and each one requires different drying times. Representatively, a glass cover slip may require about a day to dry while a film cover slip may dry in about an hour. In this aspect, coverslipped slides that are not ready (e.g., not dry) for further processing (e.g., imaging) are transported to a storage module to give them additional time to dry (bock 112). Slides that are dry are determined to be ready for imaging.

Process 100 further includes determining whether a first imager is available for imaging (block 110). In one embodiment, a first imager is an imager operable to capture an image of an entire area of a specimen on a slide in a single specimen plane. One such imager is a slide scanner that provides high speed brightfield slide scanning. Imaging of a specimen on a slide typically takes longer than the amount of time it takes to stain, coverslip and dry the slide, because imaging must be done on individual slides (i.e., one at a time) while staining and coverslipping operations may be done on a number of slides at the same time (e.g., staining a batch of slides). For example, a first imager that is a slide scanner can perform a 20× scan of a 15×15 mm tissue in about two to three minutes. Higher resolution can double that time. This equates to an imager throughput of from about 10-24 slides per hour. In contrast, up to about 500 slides per hour may be processed through a coverslipper and/or stainer. As a result, the imager is often times not ready to image each of the slides as they exit the coverslipper and/or stainer. If the imager is not available, the slides are transported from the coverslipper to a storage module for storing until a first imager is available (block 112).

Once a first imager is available, the slide is transported to the first imager for imaging (block 114). At the first imager, a digital image of the specimen is captured and stored in a computer memory (block 115). In one embodiment, the first imager is a slide scanner that is operable to scan an image of a specimen on a slide and capture and store the scanned image in a computer memory. In one embodiment, process 100 directs the first imager to scan an image of a specimen in a single plane (a single z-direction plane) at a selected magnification (e.g., 2.5×, 5×, 10×, 20×, 40×, 63×). In another embodiment, process 100 directs the first imager to scan an image of a specimen in a single plane at multiple magnifications (e.g., a first magnification of 20× and a second magnification of 40×).

Following the capturing of an image or images of a specimen on the slide by the first imager, the slide may be transported to the storage module (block 116) or to a second imager. In one embodiment, where specimens on a number of slides are processed together and images captured, examination of any one specimen image may take place at a time after the image has been captured. Until such examination, the slide is sent to the storage module.

After an image or images of a specimen, or group of specimens, is captured by the first imager and stored, the image(s) may be examined and the data may be made available to a diagnostician and/or an optional interpretation module which automatically interprets the data (block 117). As used herein, "diagnostician" refers to any person who may wish to view image data, such as pathologists, surgeons, nurses, researchers, technicians and administrators.

The image data is made available for access by a diagnostician if desired, and optionally the diagnostician is notified by electronic notification, such as by an e-mail, computer screen pop-up announcement, banner announcement, pager message or automated phone call. In other embodiments, the image data may also be accessed, or otherwise made available, to an optional interpretation module. In the case of the optional interpretation module, the interpretation module may conduct digital processing, such as by using pattern recognition technology in order to develop a preliminary diagnosis, and generate instructions or recommendations for additional processing if necessary.

In an embodiment, where specimens on a number of slides are processed and an image of each specimen is captured for examination, such examination of the images captured by the first imager may reveal that one or more of the specimens do not present an indication for more detailed analysis that may include, for example, further imaging (e.g., further image capture). As noted above, image capture of a portion of a specimen on a slide (an entire area portion of a specimen or less than an entire area portion) consumes a significant amount of time relative to other tissue processing steps. In one embodiment, the method enhances a processing and analysis time of multiple slides by separating out slides with specimens that do not show an indication of requiring additional processing from those that do show such an indication. Representatively, by capturing an image (e.g., a scan of an image in a single plane), and analyzing (examining) only that image for diagnosis minimizes the analysis time relative to, for example, capturing multiple images (e.g., images taken at different focal distances or in different planes of a specimen).

For those slides with specimens that show an indication for additional processing, the additional processing may include collecting additional biological samples, or performing further processing on samples already collected such as running additional or different test procedures or staining protocols. According to one embodiment, the additional processing includes additional imaging of a specimen. In this embodiment, process 100 is notified of a slide(s) containing specimens that are to receive additional processing by, for example, a signal from the interpretation module or by a diagnostician that has reviewed the slide(s) or queries the interpretation module or diagnostician regarding whether additional imaging is to be performed (block 118).

If additional imaging of a specimen on a slide is indicated or requested, process 100 queries whether a second imager is available (block 120). If a second imager is not available, the process maintains the slide containing the specimen in the storage module if the slide is present therein or directs the transport of the slide to the storage module (block 121). If a second imager is available, the process transports the slide to the available second imager (block 122). At the second imager, the process directs the obtaining of an additional image(s) (block 123). In one embodiment, process 100 directs multiple images of a portion of the specimen to be taken at different focal distances to provide a z-stack of the portion of the specimen or a composite image of the portion of the specimens with a greater depth of field (i.e., a thickness of the plane of focus) than an individual scan of a single plane. In another embodiment, additional images alternatively or additionally include higher magnification or higher resolution images than an image captured by the first imager.

In one embodiment, the second imagers is a digital microscope such as VISIONTEK® digital microscope, commercially available from Sakura Finetek USA, Inc. VISIONTEK® incorporates a multiple camera, brightfield optical system configured to view multiple slides simultaneously or view multiple areas of the same slide at different magnifications (e.g., 2.5×, 5×, 10×, 20×, 40×, 63×).

In one embodiment, the second imager captures multiple images of a portion of a sample and stores such images in a computer memory for review and analysis by the system or a diagnostician. In one embodiment, once the images are stored, the system or diagnostician is notified and the system or diagnostician can review the stored images. In another embodiment, a diagnostician may be notified when a slide is present in the second imager before images are stored. Where the second imager is a VISIONTEK®, the microscope offers a "live" view mode to allow a diagnostician to review a portion of a specimen without storing (saving) the image. Thus, the diagnostician may view a portion of the image at different focal distances, different resolutions (e.g., zoom in/out) and/or different magnifications without saving an image using the VISIONTEK® to analyze a specimen.

Currently, the VISIONTEK® permits the viewing of up to four slides simultaneously. In certain instances, it may be desirable to view or make available for viewing more than four slides. For example, in certain instances, more than four slides may be available for a certain patient case (e.g., seven slides, nine slides, 12 slides, etc.) and a diagnostician (e.g., a pathologist) may want to view all of the slides together. In one embodiment, a system includes multiple digital microscopes. Where each of the multiple digital microscopes is a VISIONTEK®, each microscope can accommodate four slides at one time so a diagnostician can view (examine) slide multiples of four together. In another embodiment, where a microscope is capable of loading and possibly viewing more than four slides simultaneously, for example, 12 slides (see, e.g., U.S. patent application Ser. No. 14/138,740, titled "Microscope with Slide Clamp Assembly," filed Dec. 23, 2013, incorporated herein by reference), the seven slides, nine slides, or even 12 slides of a patient case can be loaded and viewed together on a single digital microscope.

Examination, imaging and interpretation of a specimen may be continued until the system or diagnostician deems it to be complete. These repeated tests and examinations are referred to herein as iterative processing, testing or examination. In another aspect of the invention, the diagnostician may access reports that are based on the comparison data created by the interpretation module. In a further aspect of the invention, the diagnostician may order or conduct further iterative processing, testing or examination.

FIGS. 2-9 illustrate examples of automated systems for processing biological specimens. In these figures, information pathways are illustrated with solid lines and/or arrows and material pathways are illustrated with double lines and outlined arrows. As used herein, "material" refers to any biological material including histological and cytological specimens that may be examined in a medical, autopsy, veterinary or research laboratory procedure. The biological material may include tissue samples or specimens, and/or biological fluids such as blood, plasma, etc. Where the illustrated examples are described in relation to tissue, the described systems and methods are not so limited. As used herein the biological material will be referred to interchangeably as a specimen, sample or material. In addition, references relating to processing of a "slide" herein refer to a slide having the biological material thereon.

In the illustrated examples, the material pathways represent examples of transport paths that may be traveled by a physical sample in a laboratory or hospital. A typical progression of the material from one station or system component to the next is depicted by the direction of the arrow. However, it should be understood that the processing stations are provided as examples, as are the directions of material flow. It shall be appreciated that more, fewer or other processing stations may be used in practice of the present invention, and/or more, fewer or other material paths and directions may be used. In addition, the stations may be in any order and any orientation (e.g. vertically stacked or side by side).

Any form of transport may be used that is sufficient to automatically transport the material as indicated by the material pathways. For example, material may be transported by a robotic device from one station to the next as will be discussed in more detail in reference to FIGS. 4-7. The term robot or robotic is to be interpreted broadly as a conveyance, transfer device, electro-mechanical transfer device or mechanism, or automatically controlled, reprogrammable, multipurpose manipulator programmable in three, four, or more axes. The robotic device may take various forms or configurations, consistent with its intended purpose. The robotic device may be programmed with an application program, program routine, or other set of instructions. The program or set of instructions may specify one or more operations the robotic device is to autonomously or at least semi-autonomously perform. Representatively, the program or set of instructions may specify the movements (e.g., coordinates, distances, directions, etc.), timing or triggers, and like information associated with the operations. In some embodiments, the material may also, or alternatively, be hand carried from one station to the next. Additionally, one machine may perform multiple steps with no physical movement of the material from one station to another being required.

Figure 2:
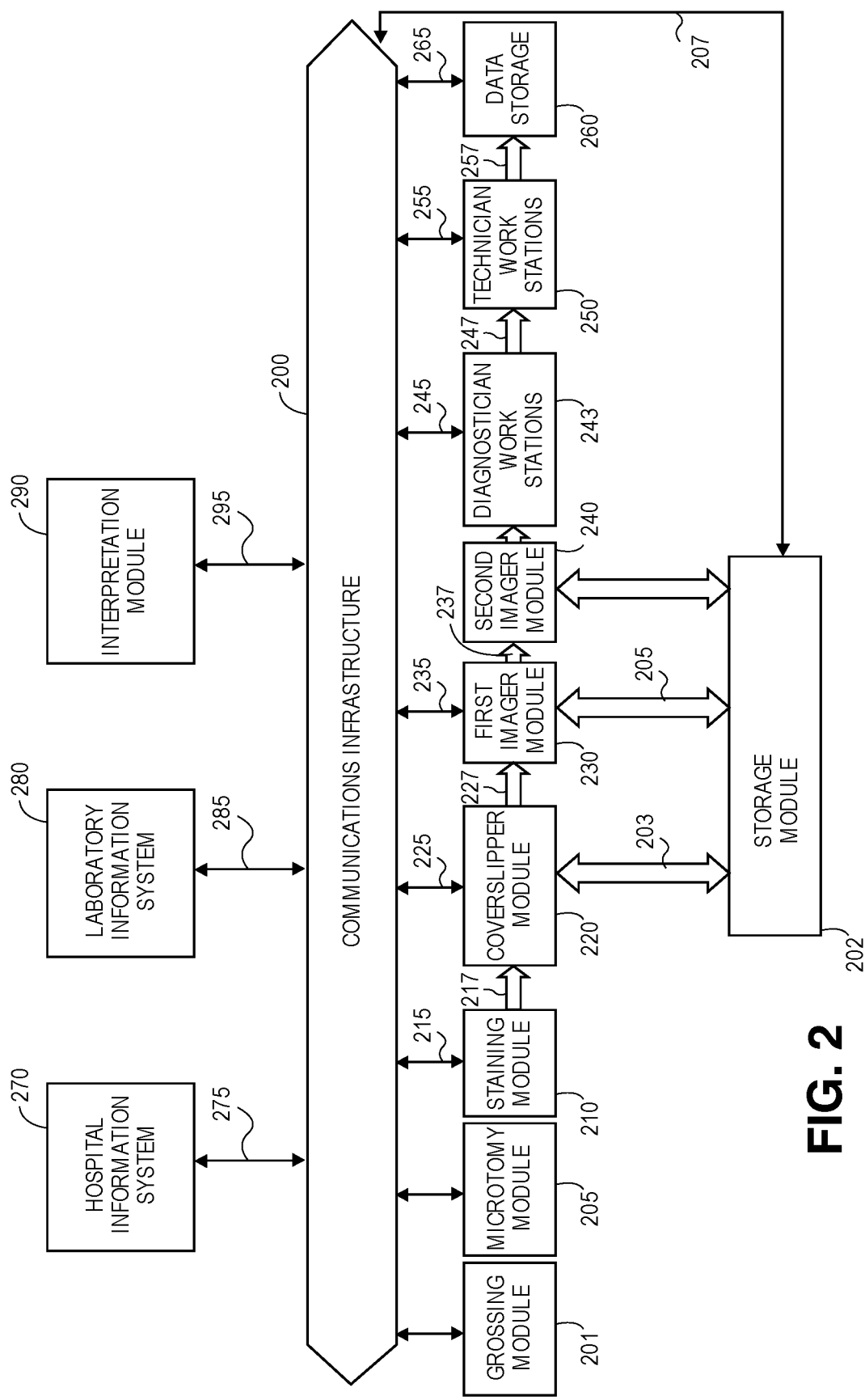
FIG. 2 illustrates one embodiment of an automated system for processing biological specimens.

In the embodiment of FIG. 2, a sample is received at laboratory receiving. The sender may have been a surgeon or other hospital technician that collected the sample from a patient in a hospital or outpatient facility. In one embodiment, the sender entered information about the sample into a database, such as a database associated with a hospital information system 270 and/or laboratory information system 280. Representative information that is entered into the database includes information about the source of the sample, patient information, the processing desired or required, and an identifier (e.g., a bar code number or radio frequency identification (RPID) tag) of an associated sample container. In another embodiment, the sender entered information about the sample on a container that contains the sample. Representatively, the sender may write on a label patient information and the processing desired or required for the sample and then place the label on the container.

At laboratory receiving, information about the sample may be read, such as by a bar code reader reading a bar code associated with an associated sample container. The bar code reader or a processor associated with the bar code reader, in one embodiment, is linked or can be linked to the database containing information about the sample, such as a database associated with a hospital information system 270 and/or laboratory information system 280. In one embodiment, the database finds the record of the shipment and displays a list of the expected contents. In an embodiment where information about the sample is printed on a label, a technician receiving the sample at laboratory receiving may enter the information into a database that, in one embodiment, is linked to hospital information system 270 or laboratory information system 280. In one embodiment, a sample identifier such as a bar code may be added to the container containing the samples.

Following receipt and acknowledgement of the shipment of the sample, the sample may be presented to grossing module 201. At grossing module 201, in one embodiment, any sample identifier (e.g., barcode) is shown to a reader and the reader or a processor associated with the reader is linked to or can be linked to the database containing information about the sample. A screen associated with the reader or processor displays a list of how the sample is to be prepared for the requested test(s). In another embodiment, rather than being linked to a database, paper documentation may be included with the sample indicating the requested test(s). The sample may be divided into the needed number of vials or cassettes, as the case may be. For non-fluid specimens such as tissue, processing may be include treatment with a series of reagents followed by infiltration with paraffin. In one embodiment, any division or preparation of the sample may be directed by the sender or a protocol, such as a protocol associated with hospital information system 270 or laboratory information system 280. In another embodiment, the technician at grossing module 201 makes a determination of any division or preparation of the sample based on his/her experience. Any vials or cassettes into which the sample or a portion of the sample is placed may be individually labeled with an identifier (e.g., a barcode), and the identifier and its association with a vial or cassette may be uploaded into the database.

From grossing module 201, the sample(s) are transferred to microtome module 205. At microtome module 205, the process of showing an identifier (e.g., a bar code) to a reader may be repeated. In one embodiment, the reader or a processor associated with the reader is linked to the database containing information about the sample. A screen associated with the reader or processor displays a list of instructions of how the sample is to be prepared for the requested test(s). In another embodiment, rather than being linked to a database, paper documentation may be included with the sample indicating the requested test(s). The sample may be embedded in paraffin and sectioned into a number of sections each placed on a slide for further processing. In one embodiment, any division or preparation of the sample may be directed by the sender or a protocol, such as a protocol associated with hospital information system 270 or laboratory information system 280. In another embodiment, the technician at microtome module 205 makes a determination of any sections of the sample based on his/her experience.

Specimen sections created in the microtome station are individually positioned on a microscope slide. A specimen mounted on a microscope slide is transported to staining module 210. Slides requiring deparaffinization may be placed in an oven prior to staining, or placed directly in the stainer if the stainer is equipped with a built-in oven or can perform a chemical deparrafinization step.

Any staining or other test protocol may be performed by the staining module 210 as desired. In one embodiment, an automated stainer is used. In an example, staining with hematoxylin and eosin ("H & E") is performed in staining module 210. Other staining methods such as special stains (SS), immunohistochemistry (IHC), and in situ hybridization (ISH) or fluorescent in situ hybridization (FISH) can also be performed.

In one embodiment, following staining, the samples may be transported along material path 217 to coverslipper module 220 to be coverslipped.

After staining and/or coverslipping, the slide may proceed to first imager module 230 or storage module 202. In some embodiments, where it is desirable for imaging of the slide to be delayed, the slide is transported to storage module 202 for storage until imaging is desired. Representatively, different methods of coverslipping exist and each one requires different drying times. Coverslipped slides that are not ready (e.g. not dry) for further processing are transported to storage module 202 along material path 203. Once the slides are ready, they may then be transported along material path 205 to first imager module 230. In this aspect, the differences in drying times from slide to slide are automatically resolved by the automated system.

In some embodiments, the laboratory can select delay criteria based on the coverslipping technique used and the type of sample (histology v. cytology, monolayer slides v. smears, etc.). For example, the laboratory may determine, based on the coverslipping technique to be used and the type of sample on the slide, that the slide should be stored for a period of time prior to imaging. This information may be contained in an identifier associated with the slide. The automated system may read the identifier and follow the assigned processing protocol. In this aspect, after coverslipping, the slide is transported to storage module 202 and stored for the predetermined period of time. After such time, the system may alert the transport module to retrieve the slide from storage module 202 and transport the slide to first imager module 230 for imaging. In one embodiment, first imager module 230 includes one or more imagers, each imager operable to or configured to capture an image of an entire area of a specimen on a slide in a single plane. A selection of the plane or z-section of the sample may be made by directed by protocol associated with hospital information system 270 or laboratory information system 280. An identifier associated with the slide may be read a first imager module 230 and be linked to the protocol. In another embodiment, a selection of the plane of the sample to image may be determined by a diagnostician responsible for analyzing the slide. In one embodiment, an imager at first imager module 230 is a slide scanner that is operable to capture an image of the specimen and store that image in memory or direct the image to a memory unit or module associated with the system.

In addition to drying times, the availability of an imager at first imager module 230 may further delay imaging. In particular, imaging of a specimen on a slide typically takes longer than the amount of time it takes to stain, coverslip and dry the slide. As a result, an imager at first imager module 230, in certain instances, cannot be ready to image each of the slides as they exit the stainer/coverslipper modules. The identifier associated with the slide may store information regarding the desired imaging protocol for the slide. Upon reading the identifier, the system schedules imaging of the slide with an imager at the first imager module 230 capable of imaging according to a requested protocol. If the desired imager is not available when the slide is otherwise ready for imaging, the slide is transported from staining module 210 and/or coverslipper module 227 along material path 203 to storage module 202 for storing until an imager at first imager module 230 is available.

It is further contemplated that after a specimen is imaged by first imager module 230, the specimen slide may be transported along material path 205 to storage module 202. The slide may be stored in storage module 202 for future testing and/or examination.

Once the specimen is ready for imaging, at least one image of the material specimen is obtained by first imager module 230. In one embodiment, an imaging protocol for each slide which is to be followed dictates one image (e.g., one scan) of a portion (e.g., an entire xy area) of a specimen on a slide in a single z plane). In another embodiment, the imaging protocol for each slide which is to be followed by an imager at first imager module 230 may be flexible and can be defined at any time by, for example, the diagnostician (e.g., pathologist). For example, a diagnostician may examine an image and determine that additional images of the slide are necessary. Representatively, the diagnostician may determine that images at a different magnification are necessary or that an imager should focus deeper into a tissue area (a different z plane). According to the automated system disclosed herein, the pathologist may instruct the system to obtain further images.

First imager module 230 may include one or more imagers. First imager module 230 can be any system that generates images that can be interpreted manually interpreted or, optionally, automatically interpreted by interpretation module 290. In one embodiment, first imager module 230 includes a scanner capable of recording digital images of the microscope's view field. For example an optical charge coupled device (CCD) based camera can be used to generate the digital image data. The digital image data can be stored in any fashion that provides for access to the data as required by interpretation module 290, diagnostician workstation 243 and/or technician workstation 250 and/or as desired by anyone needing access to the image data, such as diagnosticians or laboratory personnel. Examples of suitable data storage are local storage devices associated with first imager module 230 (such as hard drive, removable memory, flash memory, optical memory such as CD or DVD etc.), and/or networked memory such as diagrammatically illustrated by data storage 260. It should be noted that any form of information may be generated by first imager module 230, in addition to the image data. For example, first imager module 230 may optionally associate other types of data, such as a log of patient information associated with the image data and as discussed further herein. Alternatively, another processing system may associate the image data with other data.

In one embodiment, the type of information generated is intended to be sufficient for a diagnostician (e.g., a pathologist) or interpretation module 290 to perform interpretation processing and generate a desired report. Interpretation module 290 may take any desired form, such as for example, a dedicated computing system, or alternatively it may be a module running on a computing system used for multiple purposes. In additional examples, it may be freestanding, a part of first imager module 230, part of hospital information system 270, part of laboratory information system 280, or it may be in any location where data may be received from first imager module 230. Although the figure depicts a single interpretation module 290, it should be understood that plural interpretation modules 290 also may be used. In further examples, diagnostician workstations 243 may include interpretation modules 290 or interpretation module clients that enable the diagnostician to locally conduct an interpretation based on the data available including, without limitation, image data from first imager module 230.

In the embodiment of FIG. 2, interpretation module(s) 290 is in communication via communications infrastructure 200. Interpretation module 290 may access data as desired, whether directly from first imager module 230, via data storage facility 260, or via local data storage. Interpretation module uses the image data and other data to perform an analysis and a recommendation. In an embodiment, the analysis includes a pattern recognition analysis in a pattern recognition system of interpretation module 290 (e.g., a computer- or machine-automated analysis). In one form of pattern recognition, image data from first imager module 230 is compared to a database of known patterns. If a sufficient level of correspondence is found, a matching pattern is located upon which a recommendation, diagnosis or further processing instruction can be made. The pattern database can be a part of interpretation module 290, or located externally, such as for example in data storage 260 or laboratory information system 280.

Following imaging by an imager at first imager module 230, interpretation module 290 may be configured to determine if the imaged specimen should go to storage module 202, or interpretation module 290 may be configured to determine whether the particular specimen needs to undergo additional processing, such as that it should go to a diagnostician or other personnel for further inspection or additional image capture, in which case the slide containing the specimen proceeds along material pathway 237 to second imager module 240.

In another embodiment, rather than a computer- or machine-automated analysis of a specimen image on a slide, a diagnostician analyzes the specimen image(s) provided by first imager module 230 and makes a determination whether the specimen needs to or should undergo additional processing. If the diagnostician does not believe additional processing is necessary, the slide containing the specimen may remain in storage module 202, if there, or is directed to storage module 202. If the diagnostician believes additional processing is necessary, the slide containing the specimen may be sent to second imager module 240.

If additional imaging of a specimen on a slide is indicated or requested either through interpretation module 290 or a diagnostician, the slide containing the specimen is sent to second imager module 240. Second imager module 240 includes one or more microscopes. In one embodiment, the second imagers is a digital microscope such as VISION-TEK® digital microscope, commercially available from Sakura Finetek U.S.A., Inc. VISIONTEK® incorporates a multiple camera, brightfield optical system configured to view multiple slides simultaneously or view multiple areas of the same slide at different magnifications (e.g., 2.5×, 10×, 20×, 40×). In one embodiment, a second imager at second imager module 240 in operable or configured to automatically capture (obtain) additional image(s) of the specimen on the slide. In one embodiment, a second imager is operable or configured to automatically capture multiple images of a portion of the specimen are taken at different focal distances to provide a z-stack of the portion of the specimen or a composite image of the portion of the specimens with a greater depth of field (i.e., a thickness of the plane of focus) than an individual scan of a single plane. In another embodiment, a second imager is operable or configured to alternatively or additionally automatically capture higher magnification or higher resolution images than an image captured by the first imager.

In one embodiment, the second imager captures multiple images of a portion of a specimen and stores such images in a computer memory for review and analysis by the system or a diagnostician. In one embodiment, once the images are stored, the system or diagnostician is notified and the system or diagnostician can review the stored images. In another embodiment, a diagnostician may be notified when a slide is present in the second imager before images are stored. Where the second imager is a VISIONTEK®, the microscope offers a "live" view mode to allow a diagnostician to review a portion of a specimen without storing (saving) the image. The diagnostician may view a portion of the image at different focal distances, different resolutions (e.g., zoom in/out) and/or different magnifications without saving an image using the VISIONTEK® to analyze a specimen. In one embodiment, as an alternative to storing additional images or in addition to storing additional images, where a diagnostician is available at second imager module 240 at the time the slide containing the specimen is present, the diagnostician may examine the slide and decide images to be captured and stored (saved).

In certain instances, it may be desirable to view or make available for viewing more one slide at a time. In one embodiment, second imager module 240 includes an imager than can contain more than one slide so that specimens on different slides can be displayed simultaneously. Currently, the VISIONTEK® permits the viewing of up to four slides simultaneously. In another embodiment, second imager module 240 can include more than one imager, including more than one imager than can contain more than one slide. For example, in certain instances, more than four slides may be available for a certain patient case (e.g., seven slides, nine slides, 12 slides, etc.) and a diagnostician (e.g., a pathologist) may want to view all of the slides together. In one embodiment, a system includes multiple digital microscopes. Where each of the multiple digital microscopes is a VISIONTEK®, each microscope can accommodate four slides at one time so a diagnostician can view (examine) slide multiples of four together.

In one embodiment, a diagnostician makes an analysis of a specimen based on images captured at second imager module 240. Once images are captured and stored at second imager module 240, the slide containing the specimen may be sent to storage module 202.

In one embodiment, interpretation module 290 is configured or operable to determine if further processing of a sample represented by the imaged specimen is required. In such case, a new specimen of the sample is necessary for interpretation. In one embodiment, additional section(s) (specimens) of the same same may have been placed on slide(s) and those slide(s) sent to storage module 202 with a label that links the slide(s) to the imaged sample. In this embodiment, the slide(s) are not stained or coverslipped, and are kept aside. These slides could be identified as being extra sections that should not be stained and kept in the storage area until called back for staining and coverslipping. For example, these extra slide(s) may have the same identification information as the original or primary, perhaps with an additional indicator (e.g., an additional letter or number) to indicate the slide(s) are extra slide(s). If they are not needed, these slides can be discarded after, for example, a user-defined period of time has elapsed or the case has been completed and signed off. Extra sections are cut and extra slides prepared and stained only when there is a requirement for more staining protocols. In an automated handling system that also includes handling of tissue blocks, the request for more staining would be transferred to microtomy module 205. In one embodiment, a tissue block, including a formalin-fixed tissue section in a paraffin block from which another tissue section may have been taken and placed on a slide, includes an identification tag such as a bar code or RFID tag. In response to a signal from a controller, the tissue block is retrieved and transported automatically from a storage module (e.g., storage module 202) to microtomy module 205. The tissue block is stored and may be retrieved by the identification tag. The tissue block would be forwarded to the microtomy area for more sections to be taken.

Representatively, once a new sample is placed on a slide, the new sample proceeds to stainer module 210 where it may undergo operations such as special staining, immunohistochemistry ("IHC"), in situ hybridization ("ISH"), multiplexing or other staining or testing procedures. Subsequently, the new sample may proceed along the material path, for example, back to first imager module 230 or directly to second imager module 240. Ultimately it is desired that a tested and imaged specimen be stored as indicated by storage module 202. In this example, after inspection by a diagnostician or other person, the original specimen may be designated for storage, such as in storage module 202 and the new specimen from the same tissue section designated and further processed. The new specimen may be processed and inspected and sent to storage. The original specimen and the new specimen are linked by an identification tag. Later, either or both the original and the new specimen can optionally be retrieved from the storage module 202, if desired.

The workstations, such as diagnostician workstations 243 or other workstations, such as technician workstations 250 can have any desired structure, including computing systems serving as controllers in communication via communications infrastructure 200 with other processing stations or components of the system. The workstations may optionally also include other components that might be useful in a work area, such as material storage units, furniture, phones etc. In an embodiment, the workstations 243, 250 provide access to information concerning the processing of biological samples, and the results of the processing, including image data from the first imager module 230 and interpretation data or reports from the interpretation module 290. Technician workstation 250 may be in communication with data storage 260 via path 257. In another embodiment, a system may not include workstations such as diagnostician workstations 243 and/or technician workstations 250.

As the material proceeds along the material pathways and through the processing systems, information may be shared between the numerous devices using various information pathways that form communications infrastructure 200. It should be noted that communications infrastructure 200 may be any form of communication system enabling communications between and amongst individuals, computer systems and/or automated processing systems. Representatively, the communications infrastructure may be a computer network that is wired, wireless or a combination of wired and wireless. For example, information access points may be wired into the network and/or joined to the network via a wireless portal. Although the illustrated example shows a networked system in which communications are performed via a network, direct communications also may be conducted. For example in one embodiment, staining module 210 may have a direct communications link with coverslipper module 220 and may access the communications network via a node in coverslipper module 220, or alternatively it may have a direct network link. It should be understood that any suitable communications pathway structure is envisioned which would enable suitable sharing of information between and amongst various stations. Likewise, it should be understood that, in other embodiments, not all of the stations may have a direct communications path. Furthermore, it should be understood that the communication pathways can take any form, such as digital, analog, wired, wireless, paper, oral, telephonic, etc.

In one embodiment, a laboratory network may be provided as the portion of the communications infrastructure 200 between and amongst the laboratory instruments or modules, depicted with reference numbers 210, 220, 230, 240, 202 and also laboratory information system 280 and other workstations 243 and 250 (which might include a computer system such as for example one or more personal computers and/or computer servers). The laboratory network may be networked with a hospital network that is also a part of communications infrastructure 200. In such an embodiment, other devices may have access to the information available on laboratory information system 280 or other laboratory devices via the communications infrastructure 200. Such other devices include for example, diagnostician or administrator workstations 243, hospital information system 270, and in some embodiments interpretation module 290 as well. It should be understood that the flexibility of the information pathways is directed to enable the necessary information flow to track biological samples being processed however desired, and to distribute the necessary information to the appropriate users. Numerous alternative communications system structures may be selected to meet this need, and the illustrated and discussed examples are provided for illustrative purposes only, not to limit the scope or flexibility of the system.

Referring to the illustrated example, communications pathways 203, 205, 207, 215, 225, 235, 245, 255, 265, 275, 285, 295, represent examples of communications pathways between staining module 210, coverslipper module 220, first imager module 230, storage module 202, diagnostician workstation 243, technician workstation 250, local or remote data storage 260 and/or hospital information system 270, laboratory information system 280, interpretation module 290, or any other desired station or component of the system.

The sharing of information may be automated, manual or conceptual. For example, information may be shared directly by two machines in communication with each other, it may be made available to a user who can manually input it into another device, or a single machine comprising more than one device shown in FIG. 2 can engage in internal communication. This sharing of information often involves two-way communication. For example, images from a patient having a chronic condition may be sent to a database of patient information storage, and previously obtained information regarding the same patient may be retrieved from the database in order to monitor the progression of the condition. In another embodiment, each station in the material path is capable of communicating via the communications infrastructure 200 and the stations may communicate the progression of the material along the material pathways as well as other information, as discussed in further detail below.

In another embodiment, biological specimens, slides, trays, containers, workpieces, and locations throughout the system may be identified with machine understandable codes, such as provided by RFID tags, shape identifiers, color identifiers, numbers or words, other optical codes, barcodes etc. The identifiers can be recorded to generate data provided to a database, such as data maintained in data storage device 260, by a processor (any computing devices), hospital information system 270, laboratory information system 280 or any combination thereof. Examples of data that may be tracked include patient information and history, information regarding biological sample(s) collected, arrival and departure times of biological samples, tests performed on the specimens, processes performed on the specimens, reagents applied to the specimens, diagnoses made, associated images and so on.

Figure 3:
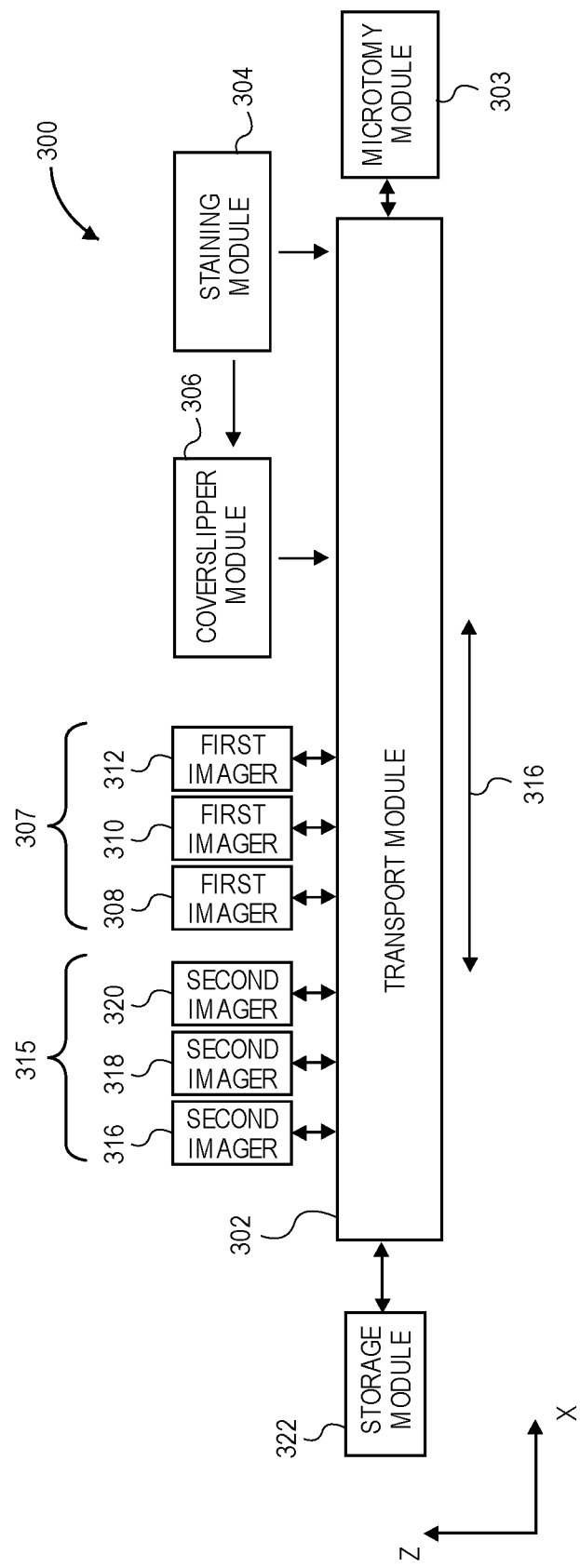
FIG. 3 illustrates one embodiment of an automated system for processing biological specimens.

FIG. 3 illustrates an embodiment of a system for automatically processing a biological specimen. System 300 includes transport module 302. Transport module 302 may automate, or at least partially automate, the transfer of slides or other tissue holders between the stations, namely from or between one or more of microtomy module 303 and staining module 304, coverslipper module 306, first image module 307, storage module 322. Automatically transporting slides or other tissue holders between staining module 304, coverslipper module 306, first imager module 307, second imager module 315, storage module 322, and microtomy module 303 as opposed to manually transferring the slides or other tissue holders, offers certain potential advantages. For one thing, it may free personnel from the necessity of having to performing these sometimes repetitive or tedious operations manually. Advantageously, this may allow the personnel to perform more value-added operations and/or other operations less amenable to automation. Another advantage is that the transport module may be better suited for performing these operations faithfully and timely than the personnel, who may at times be distracted with other tasks, or forget or be unable to perform these operations faithfully or timely. In particular, manual transport by personnel may result in missed slides, slide breakage during handling, misplacement or misreading of slides by the imager. In addition, in the case of slide storage, transport by personnel to the storage module can result in misplaced slides, incorrect documentation of slides stored within the storage module and/or costly and lengthy slide retrieval from the storage module. Advantageously, automated transport of the slides may allow improved productivity or throughput by reducing instrument downtime waiting for samples to be transferred manually. Similar advantages can be offered by automating the transfer of tissue blocks between microtomy module 303 and storage module 322.

In one embodiment, transport module 302 may be a robotic device capable of transporting a slide between stations. In one embodiment, transport module 302 may be an X-Y-Z robotic device dimensioned to transport one or more slides between stations. Representatively, transport module 302 may be a track and elevator system. The track system may be a conveyor belt or plate system that transports the slide horizontally in an "x-" direction. In this aspect, one or more slides may be placed on the conveyor and conveyed between the desired stations, for example, between coverslipper module 306, imager 308 and storage module 322. In one embodiment, the conveyor belt system may have two separate conveyor belts such that one conveyor belt transfers the slide in one direction and the other conveyor belt transfers the slide in the opposite direction as illustrated by arrow 316. Alternatively, as described with reference to FIGS. 4-9, a single conveyor belt system may be used to transport the slide in more than one direction. Transport module 302 may further include an elevator device. The elevator device transports the slide vertically in a y-direction when it is desired that a slide be positioned at a location above or below the conveyor belt. The elevator device may further include a component for transporting the slide in and out of the elevator in the z-direction.

Staining module 304 and coverslipper module 306 may be an integrated slide stainer and coverslipping system. Alternatively, staining module 304 and coverslipper module 306 may be in separate instruments at different locations. In the case of an integrated system, staining module 304 and coverslipper module 306 may be a staining/coverslipping system such as the TISSUE-TEK® PRISMA® and TISSUE-TEK® GLAS™g2 combo system or TISSUE-TEK® PRISMA® and TISSUE-TEK® FILM® combo system commercially available from Sakura Finetek U.S.A., Inc., Torrance, Calif. In one embodiment, staining module 304 may have hematoxylin and eosin stain (H&E) and special staining (SS) capabilities. At H&E/SS staining and coverslipping, a biological sample may undergo H&E or SS staining and optional coverslipping. Other staining or testing protocols also can be performed.

During operation, an individual slide or group of slides placed in a basket may be loaded into staining module 304 and stained according to a desired staining protocol. In the case of a group of slides, the staining protocol can be the same for all slides or selected from a staining protocol menu, either by an operator or automatically by reading a bar code, an RFID or any other protocol identification device. Once the staining protocol is complete, the slide or group of slides within the basket is automatically transferred to coverslipper module 306 for individual cover slipping. The identifier associated with each slide is then read as the slides are coverslipped and either placed as a group in a basket or individually fed onto transport module 302.

In an alternative embodiment, where a group of slides are stained together, the slides may be singulated (separated from the group) in staining module 304 and placed on transport module 316. For example, where a group of slides are stained together in a basket, a pick and place robotic device in staining module 304 may transfer the slides individually to transport module 316. From transport module 316, the slides may be conveyed to coverslipper module 306, or, without a coverslip, to one first imager module 307 or to storage module 322.

In one embodiment, first imager module 307 includes more than one imager (e.g., imager 308, imager 310 and imager 312 shown). Imaging methods (quick-scan, 20×, 40×, etc.) at first imager module 307 can be pre-assigned to a specimen on a slide according to a laboratory default or specific instructions from, for example, a diagnostician. In the case of basket-grouped slides, in one embodiment, each of the slides would be assigned the same scanning method(s). Individual slides or the basket of slides may be assigned to one of imagers 308, 310, 312 based on the imagers availability or according to laboratory defined rules, such as dedicating one or more imagers to a specific scanning method (e.g., quick-scan, 20×, 40×) or a plurality of methods.

In one embodiment, a slide including a biological sample is individually transported by transport module 302 to one of imagers 308, 310, 312 of first imager module 307 and/or storage module 322. If the slide is ready for imaging (e.g., dry), the system checks to see if, for example, imager 308 is available. Imager 308 is determined to be available if, for example, it is properly functioning and not currently imaging another sample on a slide. If imager 308 is not available, the availability of imager 310 is determined. If imager 310 is not available, the availability of imager 312 is determined. This process continues, until an available imager is found. Alternatively, an imaging schedule between the slide and a particular imager may be predetermined. Representatively, information relating to a period of time sufficient to allow the slide to dry may be assigned to the slide and imagers 308, 310 and 312 may be on an imaging schedule. The system may determine which imager will be available after the drying period expires. Once an available imager is determined, the slide is transported by transport module 302 to the available imager. Although three imagers are illustrated in FIG. 3, it is contemplated that fewer than three or more than three imagers may be included in system 300.

If none of imagers 308, 310, 312 of first imager module 307 are available or there are other conditions which require delay in imaging (e.g., waiting for slide processing instructions), transport module 302 transports the slide to storage module 322. The slide remains in storage module 322 until one of imagers 308, 310, 312 become available and/or processing instructions are received. Once an imager is determined to be available, the slide is transferred from storage module 322 to transport module 302 using, for example a robotic device, and transported by transport module 302 to the available imager for imaging. Upon completion of imaging, the slide may be transported by transport module 302 from imager 308, 310 or 312 to storage module 322. The image may be communicated to a diagnostician, for example a diagnostician, for immediate examination. Via a computer (e.g., a personal computer), the diagnostician can then examine an image of a sample on a slide for viewing and recall a slide for more imaging work if desired. Alternatively, if it is determined that no further examination of the slide is desired, the slide may be removed from the storage module 322. Alternatively, an interpretation module (not shown) may automatically examine a specimen on a slide using, for example, pattern recognition software, and make a determination whether a slide should be recalled for additional imaging work.

If additional imaging of a specimen on a slide is indicated or requested either through an interpretation module or a diagnostician, the slide containing the specimen is transported via transport module 302 from, for example, storage module 322 to second imager module 315. Second imager module 315 includes one or more imagers or microscopes (e.g., imager 316, imager 318, imager 320). In one embodiment, the one or more second imagers are a digital microscope such as VISIONTEK® digital microscope, commercially available from Sakura Finetek USA, Inc. In one embodiment, a second imager (e.g., imager 316, imager 318 or imager 320) is operable or configured to automatically capture multiple images of a portion of the specimen are taken at different focal distances to provide a z-stack of the portion of the specimen or a composite image of the portion of the specimens with a greater depth of field (i.e., a thickness of the plane of focus) than an individual scan of a single plane. In another embodiment, a second imager is operable or configured to alternatively or additionally automatically capture higher magnification or higher resolution images than an image captured by the first imager.

In one embodiment, a second imager (e.g., imager 316, imager 318 or imager 320) captures multiple images of a portion of a specimen and stores such images in a computer memory for review and analysis by the system or a diagnostician. In one embodiment, once the images are stored, the system or diagnostician is notified and the system or diagnostician can review the stored images. In another embodiment, a diagnostician may be notified when a slide is present in the second imager before images are stored. Where the second imager is a VISIONTEK®, the microscope offers a "live" view mode to allow a diagnostician to review a portion of a specimen without storing (saving) the image. The diagnostician may view a portion of the image at different focal distances, different resolutions (e.g., zoom in/out) and/or different magnifications without saving an image using the VISIONTEK® to analyze a specimen. In one embodiment, as an alternative to storing additional images or in addition to storing additional images, where a diagnostician is available at second imager module 315 at the time the slide containing the specimen is present, the diagnostician may examine the slide and decide images to be captured and stored (saved).

In certain instances, it may be desirable to view or make available for viewing more one slide at a time. In one embodiment, multiple imagers (e.g., imager 316, imager 318 and/or imager 320) at second imager module 315 are used at the same time to each contain one or more slides related, for example, to a single patient case. In this manner, specimens on different slides can be displayed simultaneously.

In one embodiment, storage module 322 may include more than one storage module. In this aspect, one or more of the storage modules may act as short-term storage areas for slides likely to need more imaging work. In addition, one or more of the storage modules may act as long-term storage areas for slides which are unlikely to require more imaging work in the near future. The long-term storage modules may be located within the laboratory or remotely.

In one embodiment, storage module 322 is configured to group slides (and tissue blocks for the block storage system) according to user-defined criteria. For example, slides pertaining to a patient case could be placed in the same area. Then cases or blocks can be located by date of production, by physician, by provenance, or by a combination of these criteria. Representatively, as noted above, a slide may contain an identifier that may be read by a reader (e.g., RFID reader, bar code reader). That identifier (e.g., RFID, bar code) may contain information (e.g., letters, numbers and/or symbols) indicating a date of production, a physician and/or a provenance. When the information is read by a reader, the information may be sent to a controller or to other devices through the communications infrastructure.

Automated system 300 as illustrated in FIG. 3 provides fully automated movement of slides between staining module 304, coverslipper module 306, first imager module 307, second imager module 315 and storage module 322. In this aspect, system 300 provides a seamless and continuous workflow which is in sync with other laboratory processes and eliminates the need for overnight processing and batching while reducing personnel errors and liabilities. It is further noted that there are no touch points from staining to storage in system 300 therefore system 300 is believed to satisfy even the most stringent quality control programs such as Lean and Six Sigma.

Figure 4:
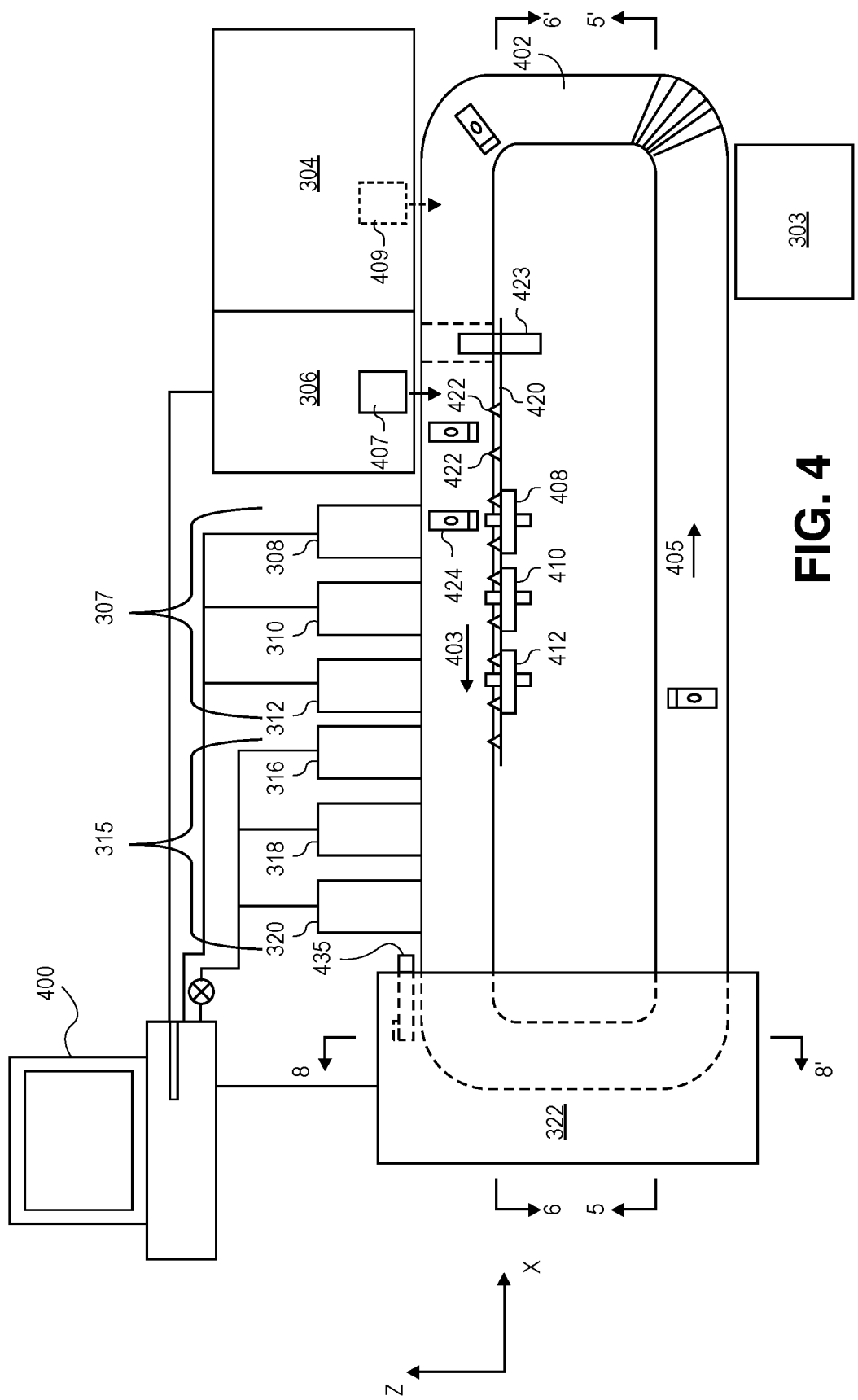
FIG. 4 illustrates a top view of one embodiment of an automated system for processing biological specimens.

FIG. 4 illustrates an embodiment of the system of FIG. 3. In this embodiment, stainer module 304 is a TISSUE-TEK® PRISMA®stainer and coverslipper module 306 is a TISSUE-TEK® FILM® coverslipper, both commercially available from Sakura Finetek USA. The TISSUE-TEK® PRISMA® stainer module and TISSUE-TEK® FILM® coverslipper module may be connected to one another and a loading container used in the coverslipper module to hold one or more racks of slides prior to a coverslipping operation may move between the coverslipper module 306 and stainer module 304. A brief description of the interaction between these modules is presented in the following paragraphs.

In order to automate the movement of the loading container in the coverslipper module 306 between coverslipper module 306 and stainer module 304, software instructions and a data link between coverslipper module 306 and stainer module 304 are provided. Such instructions and link may be solely between coverslipper module 306 and stainer module 304. Alternatively, a control system may be connected to each of strainer module 304, coverslipper module 306, first imagers 308, 310, 312 of first imager module 307, second imagers 316, 318, 320 of second imager module 315, storage module 322 and transport module 302 that may be used to transport a slide between imagers and the modules. FIGS. 4-9 describe controller 400 connected to each of the noted modules. In such case, instructions regarding the transfer and a data link may be established between the modules and the control system. In such case, controller 400 may control the transfer operations between stainer module 304 and coverslipper module 306. Controller 400 may also control (e.g., direct operation of) the various other modules and imagers as well as control slides relative to the modules and imagers.

Referring again to movement of a loading container from stainer module 304 to coverslipper module 306, the loading container sits on a plate that is connected to wires that move the plate and the loading container in an x- and y-direction, respectively, by two-step motors. The plate may move the loading container in an x-direction into the stainer.

In operation, a transfer arm of stainer module 304 retrieves a rack of slides and moves the rack along an xy axis to one or more individual staining stations. The transfer arm transfers a rack of slides to an appropriate staining station and then lowers the rack into that staining station for staining (a z-direction). Following staining, the transfer arm removes the rack of slides from the staining station and moves in x- and y-direction to another staining station or, when all staining operations are complete, to a transfer station where the rack of slides is to be transferred from the stainer to the Film® coverslipper module (coverslipper module 306).

For a transfer operation between stainer module 304 and coverslipper module 306, the loading container in coverslipper module 306 receives instructions to move from coverslipper module 306 to stainer module 304 through the adjacent doorways in each device. The loading container is moved by the plate on which it sits along a single plane (xy plane) from the coverslipper to a position inside the stainer adjacent the doorway of the stainer module. Once inside the stainer module, the transfer arm lowers the rack of slides into the loading container. The loading container typically contains a solution such as xylene that wets the slides. The loading container then moves on the x-direction plate from the stainer into the coverslipper again through the adjacent doorways. A cover slipping operation including placing a film-type cover slip on individual slides in the basket of slides is then performed in the coverslipper.

Transport module 302 may be a robotic device capable of transporting a slide between stations. In the embodiment shown in FIG. 4, transport module 302 may be a robotic device including conveyor 402 that is a conveying system to transport a slide or group of slides horizontally in a loop between stainer module 304/coverslipper module 306, first imager module 307, second imager module 315 and storage module 322. In this embodiment, conveyor 402 transports a slide in one direction as illustrated by arrow 403 from stainer module 304 or coverslipper module 306 to imagers 308, 310, 312 to second imagers 316, 318, 320 and to storage module 322 and in an opposite direction as illustrated by arrow 405 from storage module 322 to first imagers 308, 310 and 312 or second imagers 316, 318, 320. In one embodiment, conveyor 402 may be a conveyor belt or a set of conveying pallets disposed in a horizontal plane and dimensioned to transport a slide or group of slides. A conveying system that is a set of conveying pallets may be similar to systems currently used in luggage carousels at commercial airports. Such carousels typically include a deck that is surrounded by support wheel tracks. The support wheel tracks define a path that is frequently oval shaped. Evenly spaced along the wheel tracks are pallet support members.

Attached to each end of the pallet support members are support wheels. The support members are configured to be transported along the support wheel tracks by the rolling of the support wheels. The support members are connected to each other at the top by straps that run between support members. The bottoms are connected to each other by rigid links. Thus, the support members, the support wheels, and the straps function in a manner analogous to a train on endless railroad tracks.

Attached to the pallet support members are pallets. The pallets are designed to overlap one another and are secured to the pallet support members to form a flexible surface. The overlap configuration of the pallets allows them to slide relative to each other as the pallets travel around the corners of the tracks. The leading edge of the pallets are secured to the support members by fasteners. Each of the pallets may have a slight bend to negotiate the curves in the unit.

In the embodiment shown in FIG. 4, conveyor 402 receives a slide from coverslipper module 306 and conveys the slide to one of first imagers 308, 310, 312 of first imager module 307. Referring to the TISSUE-TEK® FILM® coverslipper, coverslipper module 306 individually places a film strip on a slide. With the system described in reference to FIG. 4, the slide is then moved to a discharge position in coverslipper module 306 and discharged onto conveyor 402 from coverslipper module 306 onto conveyor 402. A discharge position in coverslipper module may be established at a position downstream of the coverslipping operation. Referring to FIG. 4, a slide, such as slide 424, is discharged onto conveyor 402 in a manner that its length dimension is disposed across a width dimension of conveyor 402. Reader 423, such as an RFID or bar code reader, may be positioned at a discharge point onto conveyor 402 or downstream from a discharge point to read an identifier on slide 424. Reader 423 is connected to controller 400 to indicate to controller 400 that slide 424 is on conveyor 402. Once delivered to conveyor 402, conveyor 402 conveys slide 424 toward first imagers 308, 310, 312.

As noted earlier, in this embodiment, multiple slides are brought to converslipper module 306 from stainer module 304 in a rack. In coverslipper module 306, the slides are singulated (separated from other slides in a rack) for coverslipping. In one embodiment, all stained slides in coverslipper module 306 are coverslipped. In another embodiment, a coverslipping operation may be bypassed. Such bypass can occur at the singulation point in coverslipper module 306. According to this embodiment, a slide is singulated and either directed to be directly discharged onto conveyor 402 or to be coverslipped and then discharged.

In one embodiment, a slide retaining device is positioned adjacent to or connected to conveyor 402. Slide retaining device 420, in one embodiment, is an oval-shaped chain or belt (e.g., a continuous loop) having projections 422 extending outwardly therefrom. Projections 422 are spaced from one another at approximately a width of a slide.

As shown in FIG. 4, stainer module 304, coverslipper module 306, first imagers 308, 310, 312 of first imager module 307 and second imagers 316, 318, 320 of second imager module 315 are positioned on one side of conveyor 402. Slide retaining device 420 is positioned on a side of conveyor 402 opposite to the side including stainer module 304, coverslipper module 306 and the imager modules. Projections 422 of slide retaining device 420 project outward in a direction toward conveyor 402. A length of slide retaining device 420 is positioned adjacent conveyor 402 so that projections 422 extend a distance on to conveyor 402. In one embodiment, slide retaining device 410 is a synthetic rubber or other plastic material with projections 422 of similar preferably resilient material. Projections 422 have a thickness of 0.5 millimeters (mm) or less, such as 0.25 mm, and a length of 0.5 mm to 1 mm. Slide retaining device 420 projects above the plane defined by conveyor 402 a distance sufficient to allow a length of projections 422 to lay on conveyor 422 or slightly above (e.g., less than 0.25 mm above) conveyor 422. In this manner, a slide may be retained on conveyor 402 between two adjacent projections 422.

Figure 5:
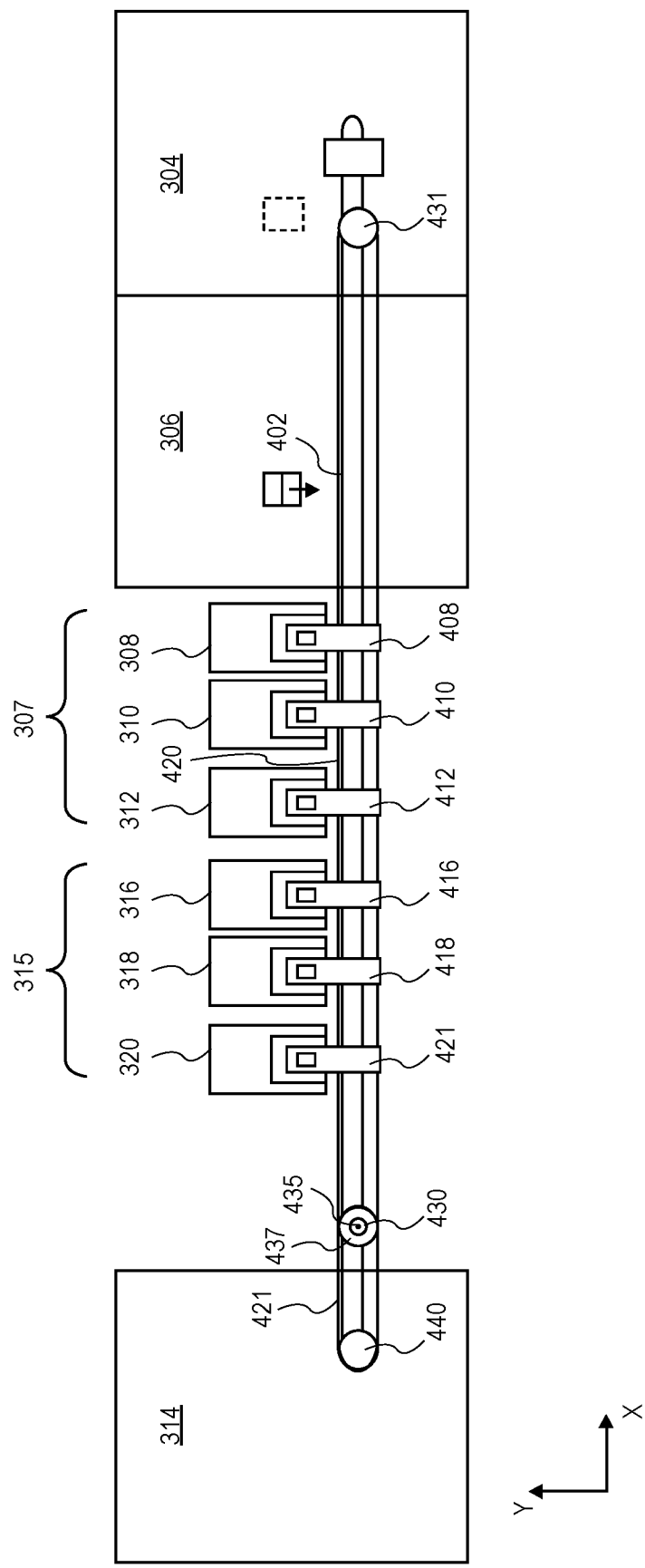
FIG. 5 illustrates a side view of the automated system of FIG. 4 through line 5-5'.

Slide retaining device 420 is rotated by a pulley and moves at the same rate as conveyor 402. FIG. 5 shows a side view of the system of FIG. 4 through line 5-5'. As shown in FIG. 5, slide retaining device 420 is connected at one looped end to pulley 430 and the other looped end to pulley 430. Pulley 430 rotates on axle 435. Axle 435 extends a width of conveyor 402 to an opposite side where a second end of axle 435 is connected to pulley 437. Pulley 437 is connected through a belt to pulley 440 that drives conveyor 402.

As illustrated in FIGS. 4-6 and 7, slides, such as slide 424 are discharged from coverslipper module 306 or optionally stainer module 204 individually and are placed on conveyor 402. Conveyor 402 may be positioned, for example, slightly below exit port 407 of coverslipper module 306 (and optional exit port 409 of stainer module 304) so that slides are placed onto conveyor 402 via gravity. Ideally, a slide is placed on conveyor 402 between two projections 422 of slide retaining device 420. However, where a slide is not aligned between projections 422 as the slide exits coverslipper module 306, a force of a projection against an edge of a slide is sufficient to re-position a slide between projections.

Conveyor 402 transports a slide to first imagers 308, 310, 312 of first imager module 307. Imagers 308, 310, 312 are, for example, scanners and may further each contain a reader (e.g., RFID reader, bar code reader) connected with controller 400 to read an identifier on a slide indicate to controller 400 that a slide is in the imager and to associate a digital image with the identifier. In one embodiment, conveyor 402 stops at each imager and controller 400 assesses the availability of the imager (e.g., receives a signal that indicates whether or not an imager is available). If an imager is available and control system (e.g., controller 400) determines that a slide may be imaged at this time (e.g., the slide is dry), the slide is placed in the imager.

In one embodiment, a slide is placed in an imager by applying a pushing force to the slide. In this embodiment, associated with each first imager 308, 310, 312 and controlled by controller 400 is a plunger assembly. FIGS. 4-7 show plunger assembly 408, 410 and 412 associated with first imagers 308, 310, 312, respectively. Plunger assembly 408, 410 and 412 are positioned on a side of conveyor 402 opposite imagers 308, 310 and 312.

Each plunger assembly 408, 410, 412 includes an actuator such as an electrical motor or air piston that drives a corresponding plunger to extend or retract. A plunger, when actuated, moves outward from the plunger assembly toward the respective imager. The plunger may be a bar or rod having a thickness equivalent to or greater than a thickness of a slide. Each plunger assembly is positioned adjacent conveyor 402 such that when a plunger is extended from a plunger assembly, the plunger will contact a surface of conveyor 402 or extend over conveyor 402 a slight distance (e.g., 0.1 to 0.25 mm). Plunger must be close enough to conveyor 402 that it is capable of contacting an edge of a slide on the conveyor and pushing the slide off conveyor 402 as it extends. To the extent a height of slide retaining device 420 would otherwise prevent a plunger form contacting an edge of a slide, plunger is made of a material having sufficient weight or density to deflect slide retaining device 420. For example, a plunger comprised of a steel bar or rod can be made of a sufficient weight to deflect slide retaining device 420 of a synthetic rubber belt downward. In another embodiment, a plunger may extend from a plunger assembly at an angle slightly less than horizontal (e.g., less than 5°) so that the plunger will deflect slide retaining device 420 to be at most parallel with a surface of conveyor 402.

Figure 7:
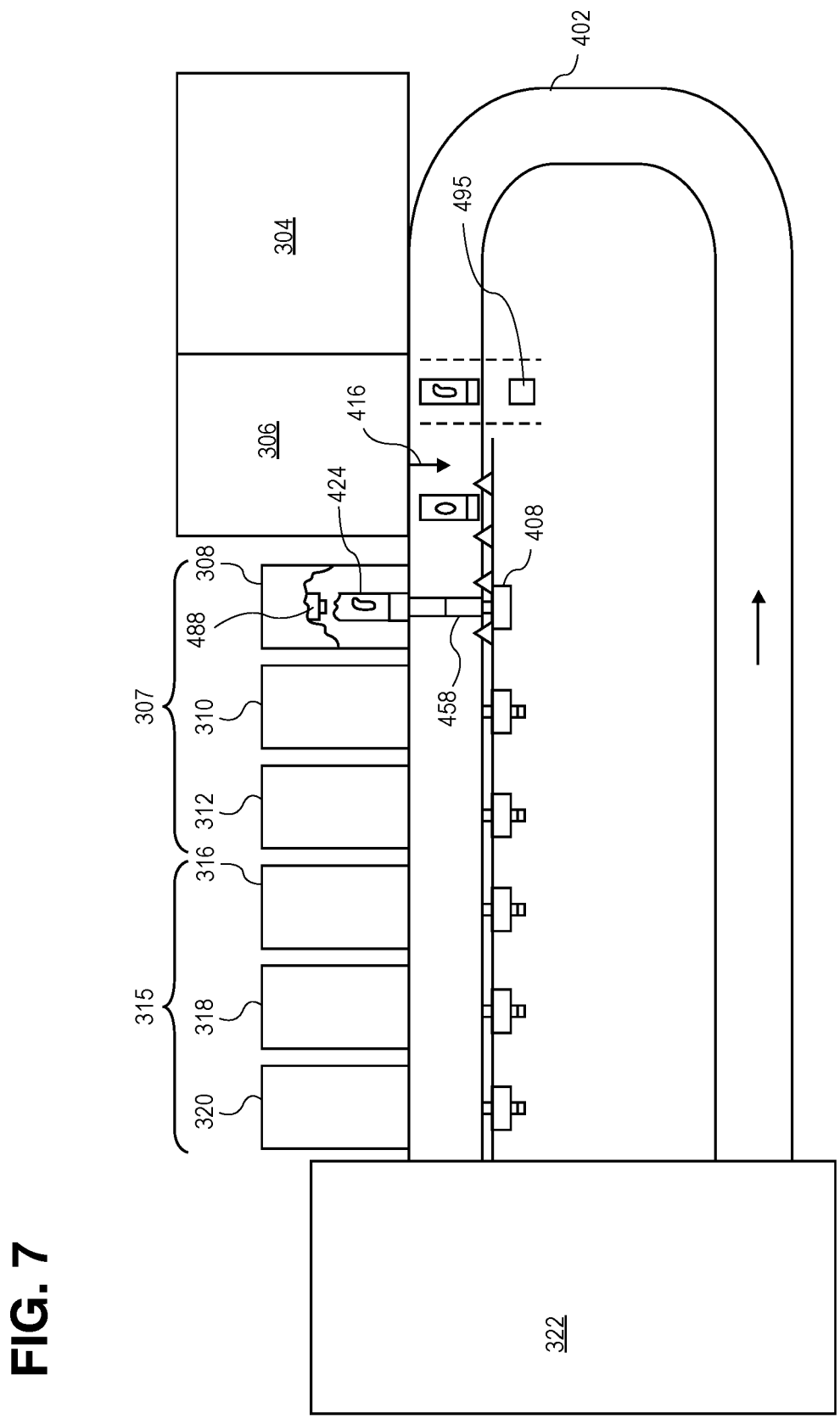
FIG. 7 illustrates a top view of the automated system of FIG. 4 showing a slide placed in an imager.

If a slide is positioned in front of first imager module 307 (in front of one of first imagers 308, 310, 312) and the imager is available, the plunger will push the slide into imager. Thus, the plunger is oriented such that it will contact an edge of a slide on conveyor 402. FIG. 7 shows an illustration of a slide pushed from conveyor 402 into first imager 308. FIG. 7 shows plunger 458 actuated from plunger assembly 408 and extending across conveyor 402. The actuation of plunger 458 causes plunger 458 to contact slide 424 and push slide 424 into first imager 308. A cut-away view of first imager 308 shows slide 424 on a stage or imaging platform within first imager 308 and ready for imaging. The cut-away view also shows plunger assembly 488 on a side of a stage or imaging platform opposite plunger assembly 488. Plunger assembly 488 is configured to push slide 424 from inside first imager 308 back onto conveyor 402 once imaging of slide 475 is complete.

As noted above, in one embodiment, controller 400 is connected to stainer module 304, coverslipper module 306, first imagers 308, 310, 312 of first imager module 307, second imagers 316, 318, 320 of second imager module 315, plunger assemblies 408, 410, 412, 418, 421 corresponding plunger assemblies associated with each imager, storage module 322 and conveyor 402. In addition to optionally controlling a staining of slides in stainer module 304 and coverslipping slides in coverslipper module 306, controller 400 includes instructions (e.g., a computer program) for controlling a discharge of a slide from coverslipper module 306 or, optionally, stainer module 304 onto conveyor 402 and the movement of conveyor 402 to bring a slide to first imagers 308, 310, 312 or first imager module 307 and/or to second imagers 316, 318, 320 of second imager module 315.

To control discharging of a slide onto conveyor 402 from coverslipper module 306, controller 400 receives data from coverslipper module 306 whether a slide is ready for discharge. In one embodiment, this data is provided to controller 400 in the form of a signal when a slide is positioned in a designated area in coverslipper module 306. The slide may or may not have proceeded through a coverslip operation in coverslipper module 306. Controller 400 checks to see if a position on conveyor 402 is free to receive a slide. In the embodiment shown in FIGS. 4-7, the system includes sensor 495 positioned approximately one slide width upstream of exit port 416 of coverslipper module 306. Sensor 495 may be, for example, a photoelectric sensor that sends a light beam across a surface of conveyor 402. When the beam is broken, a sensor sends a signal to controller 400 that a slide is present. It is appreciated that, in an embodiment where a slide may be discharged from stainer module 304, a similar technique may be employed with, for example, a sensor similar to sensor 495.

Figure 6:
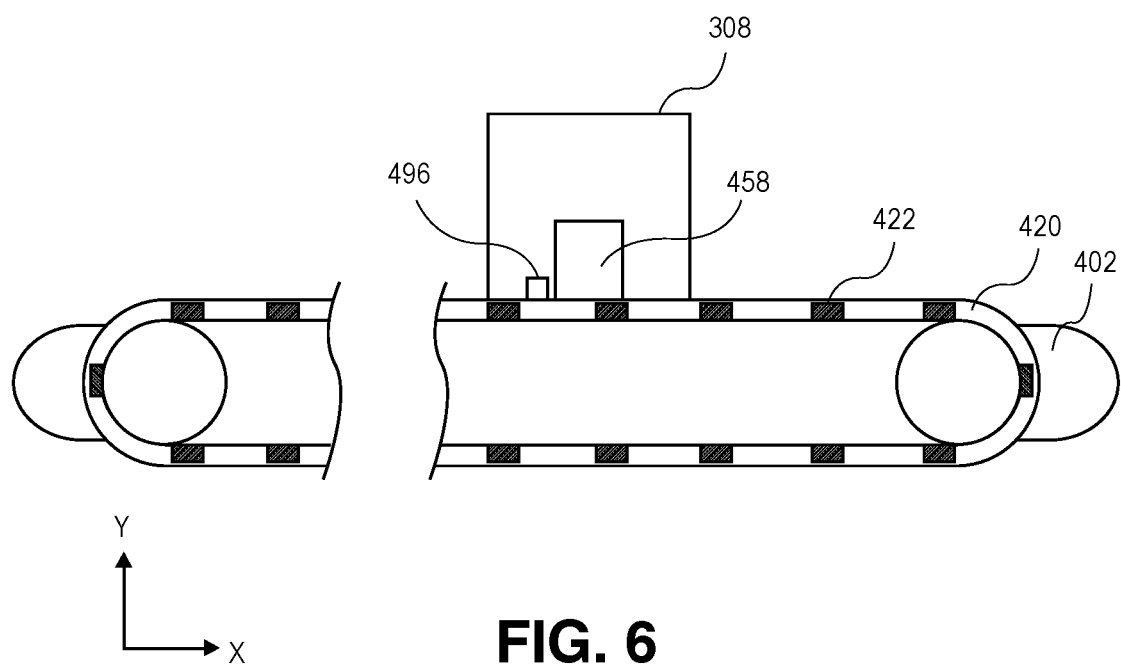
FIG. 6 illustrates a side view of the automated system of FIG. 4 through line 6-6'.

In one embodiment, control system stops conveyor 402 for a brief moment (e.g., three to five seconds) in periodic intervals each time a slide could be positioned in front of an imager (any of the first imagers or second imagers). Controller 402 receives a signal whether the imager is available for receiving a slide for imaging. It may receive this signal in an unsolicited fashion (e.g., a sensor associated with the sensor sends a signal whenever the imager is available) or it may solicit the signal (e.g., controller sends a signal to a sensor associated with the imager and receives a reply to the sent signal from the sensor). If a slide is present on conveyor 402 and an imager is available, control system will activate a corresponding plunger assembly to place a slide in the imager. Similarly, controller 400 checks when an imaging of a slide is complete and subsequently discharges the slide onto conveyor 402. In one embodiment, a sensor such as a photoelectric sensor may be associated with, including connected or adjacent to, each of plunger assembly 408, 410, 412 to sense whether a slide is present on conveyor 402 or conveyor 402 is free to receive a slide from one of first imagers 308, 310, 312 of first imager module 307 or one of second imagers 316, 318, 320 of second imager module. FIG. 6 shows sensor 496 connected to first imager 308. In one embodiment, a corresponding sensor component may be connected to first imager 308 directly across from sensor 496. Alternatively, a memory associated with controller 400 may track the position of slides on conveyor 402 based on data supplied by sensor 495 and by coverslipper module 306, and with this data, compute whether conveyor 402 is free to receive a slide from first imagers 308, 310, 312 of first imager module 307 and imagers 316, 318, 320 of second imager module 315. The brief stoppage of conveyor 402 also may be utilized to assess whether a slide is on conveyor 402 upstream of an exit port of coverslipper module 306, such as based on data received from sensor 495.

Although plunger assemblies are described for transferring slides between conveyor 402 and imagers, it is contemplated that any other type of robot device suitable for transferring a slide between processing stations may be used. Representatively, a robotic arm capable of grasping slide 424 and transferring slides between imagers and conveyor 402 may be used. For example, in embodiments where a group of slides are transported within a basket, slides must be removed individually from the basket for imaging. In this aspect, a Gantry or Cartesian coordinate type robot, a selective compliant assembly robot arm (SCARA) type robot, an articulated arm type robot, or a combination thereof (e.g., a SCARA type robot coupled in a Gantry type robot configuration) may be used to retrieve and deposit individual slides within the basket.

In one embodiment described with reference to FIGS. 3-7, stainer module 304 and coverslipper module 306 are connected and slides are conveyed by stainer module 304 to coverslipper module 306 through a commercially available integrated system, although in another embodiment, such conveyance can alternatively be controlled by controller 400 as part of an overall control system. In another embodiment, slides may be transferred from stainer module 304 to conveyor 402 and then conveyed via conveyor 402 to coverslipper module 306 using, for example, a plunger assembly (ies) such as described above or other type of transfer mechanism.

FIGS. 4-7 also show conveyor 402 extending into storage module 322. In one embodiment, conveyor 402 has a continuous loop shape with one end of the loop extending into and out of storage module 322.

Figure 8:
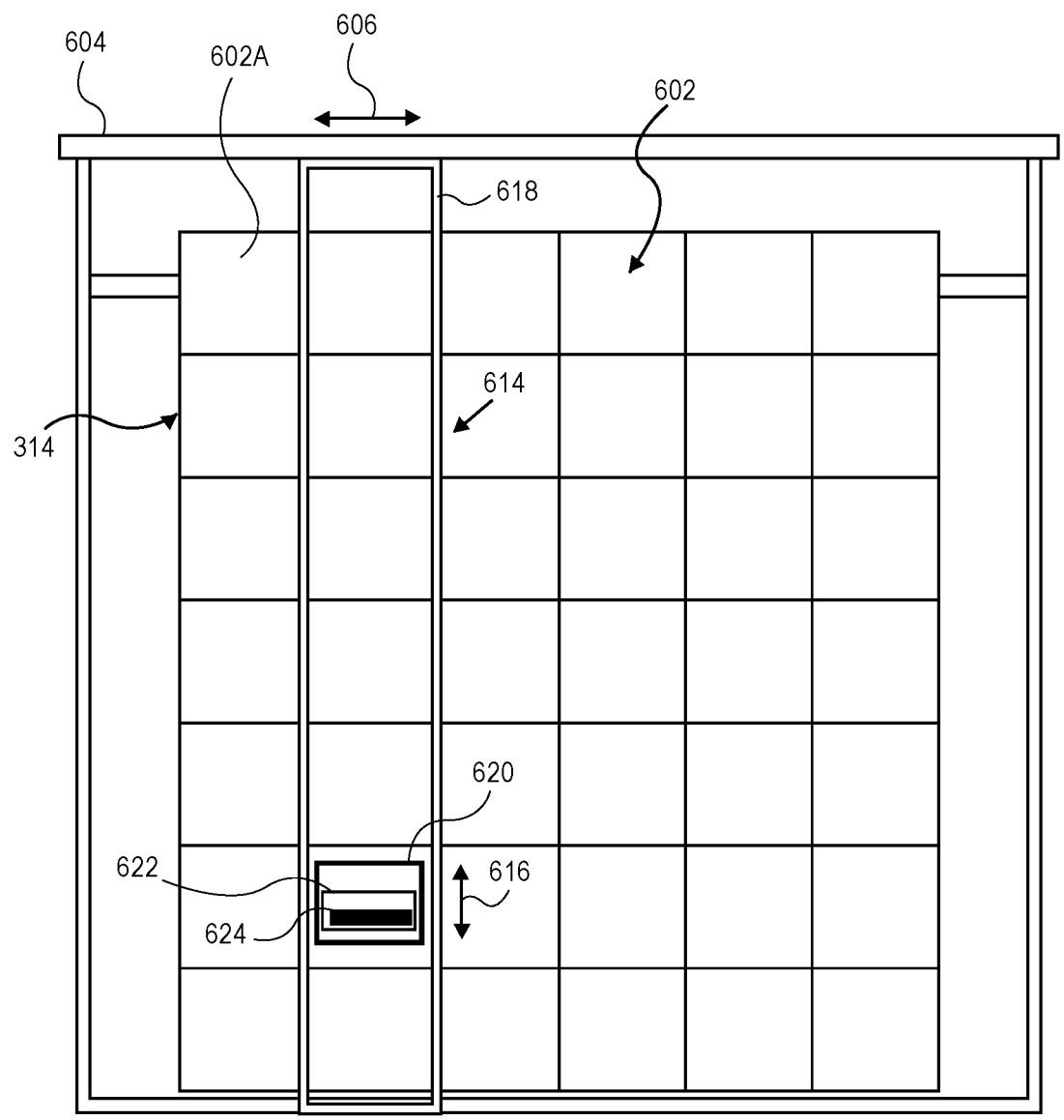
FIG. 8 illustrates a side view of the automated system of FIG. 4 through line 8-8'.

FIG. 8 illustrates a cross-section of storage module 322 through line 8-8' of FIG. 4. In one embodiment, storage module 322 may include at least one of a drawer, chamber, compartment, cabinet, enclosure, cubbyhole, or the like. A robotic device such as transport module 302 may be capable of introducing a slide into storage module 322, and removing the slide from storage module 322, for example, via conveyor 402. Storage module 322 may further include a door which may be accessed by transport module 302.

In an embodiment where storage module 322 is a cabinet, storage module 322 may have a plurality of slide stations 602. Each of slide stations 602 may be dimensioned to receive and store a slide. In one embodiment, slide stations 602 are dimensioned to receive and store a slide individually or a group of slides. In the case of a group of slides, the slide group may be stored in slide stations 602 in a tray or basket. For example, a tray or basket holding 10 slides may be stored within one of slide stations 602. In this aspect, slide stations 602 are dimensioned to store the tray or basket having the sides therein.

In one embodiment, stations 602 may be formed in a grid pattern as illustrated in FIG. 8. Slides stored within stations 602 may be located and retrieved from storage 314 using an indexing system including, for example, coordinates corresponding to the grid pattern. Representatively, each column may be assigned an identifier and each row may be assigned a different identifier from that of the columns. For example, the first column starting from the left hand side of storage module 322 may be assigned the identifier "1" and the first row starting at the top of storage module 322 may be assigned the identifier "A." In this aspect, the location of station 602A may be A1. A slide stored within station 602A may be assigned location A1. When it is desired to retrieve the slide, the system is directed to retrieve the slide at location A1. In other embodiments, slide stations 602 may be vertically stacked compartments within storage module 322.

Transport module 302 may include one or more elevator devices positioned in storage module 322 to place slides within or retrieve slides from slide stations 602 and transfer slides between slide stations 602 and conveyor 402.

Elevator device 614 may be used to move the slide vertically between conveyor 402 (a y-direction in reference to FIG. 4). Elevator device 614 also includes track member 604 which allows for movement of frame member horizontally in a z-direction (with reference to FIG. 4) as illustrated by arrow 606. Elevator device 614 may be positioned between conveyor belt 402 and slide stations 602. Elevator device 614 may include frame member 618 and lift member 620 which travels along frame member 618. A motor and pulley system may be connected to frame member 618 and lift member 620 to drive lift member 620 along frame member 618.

Elevator device 614 may further include slide platform 622 positioned within lift member 620. Slide platform 622 may be movably coupled to lift member 620 such that it slides horizontally in an x-direction to eject the slide from or receive the slide within elevator device 614. Slide platform 622 is dimensioned to receive and retain slide 624 within lift member 620. In one embodiment, slide platform 622 may be a rectangularly shaped box having open ends and of a size configured to contain a single slide (e.g., 1 in.×1 in×3 in.). Slide platform 622 may be at least as wide as a width of the slide so that the slide may be positioned thereon. The slide may be inserted into and retrieved through either side of slide platform 622. Alternatively, slide platform 622 may be a planar member (a true platform) upon which the slide can be supported by slide platform 622.

Elevator device 614 may be used to transfer slide 624 between conveyor 402 and slide stations 602. Representatively, conveyor 402 may transport slide 624 from, for example, coverslipper module 306 or imagers 308, 310, 312, to slide stations 602. Conveyor 402 moves slide 624 horizontally in the x-direction until slide 624 is aligned with slide platform 622. In this aspect, lift member 620 moves vertically in the y-direction along frame member 618 until slide platform 622 is aligned with slide 624. Once slide platform 622 is aligned with slide 624, slide platform 622 moves in the x-direction toward conveyor 402 until it is positioned around slide 624. In one or more embodiments, slide platform 622 may include pincers, claws, jaws, hook-like structures or another gripping member. Slide platform 622 then moves in the opposite direction (i.e., away from conveyor 402) with slide 624 inside. Lift member 620 raises slide platform 622 having slide 624 therein until slide 624 is aligned with opening 428 of slide stations 602. Slide platform 622 then moves in the "X" direction toward slide stations 602 to insert slide 624 within the opening of the slide station. Once slide 624 is within the opening, slide platform 622 releases slide 624 and retracts (i.e. moves away from slide stations 602) thereby leaving slide 624 within slide stations 602 for storage.

Once storage is complete, elevator device 614 may be used to remove slide 624 from slide stations 602 and place it back on conveyor 402 for transport to, for example, first imager module 307 or second imager module 315.

Although elevator device 614 is described for transferring slide 624 between conveyor 402 and slide stations 602, it is contemplated that any other type of robot device suitable for transferring a slide between processing stations may be used. Representatively, a robotic arm capable of grasping slide 624 and transferring slide 624 between slide stations 602 and transport module 302 may be used. For example, in embodiments where a group of slides are transported within a basket, slides must be removed individually from the basket for imaging. In this aspect, a Gantry or Cartesian coordinate type robot, a selective compliant assembly robot arm (SCARA) type robot, an articulated arm type robot, or a combination thereof (e.g., a SCARA type robot coupled in a Gantry type robot configuration) may be used to retrieve and deposit individual slides within the basket.

As previously discussed, a slide may be inserted and stored in any of stations 602 which are positioned in a grid pattern. In this aspect, the robotic device for inserting and retrieving the slides must be able to move both vertically in the y-direction and horizontally in the x-direction. To store a slide or retrieve a slide stored in station 602A, lift member 620 of elevator device 614 moves vertically as illustrated by arrow 616 up to the top row (e.g. row A) of storage module 322. Frame member 618 then moves horizontally as illustrated by arrow 606 to the first column (e.g., column 1).

To store slide 424 within station 602A, slide platform 422 moves in the "z-" direction toward storage module 322 and inserts slide 424 within station 602A. Once slide 424 is positioned within station 602A, slide platform 622 moves in a direction away from storage module 322 leaving slide 624 behind within station 602A. To retrieve slide 624 from station 602A, slide platform 622 is inserted within station 602A and around slide 624. Movement of slide platform 622 away from station 602A pulls slide 624 out of station 602A and into elevator device 614. Lift member 620 of elevator device 614 may then be raised or lowered to transfer slide 624 to conveyor 402. Conveyor 402 may then be used to convey slide 624 to imager 308, 310, 312.

The identification, placement and retrieval of a slide within storage module 322 may be controlled by controller 400 that is electrically or communicatively linked to transport module 302. In one or more embodiments, movement or operation of transport module 302 may be based on signals exchanged between the controller and storage module 322. For example, in one embodiment, such a controller may receive a signal from coverslipper module 306 indicating that a slide is ready for storage. In response, the controller may signal transport module 302 to retrieve the slide from the coverslipper module and transfer the slide to storage module 322. A reader (e.g., an RFID or bar code reader) may be positioned at the entrance to storage module to read an identifier associated with the slide. This information is transmitted to controller 400. The controller may identify an open slide station within storage module 322 and signal transport module 302 to insert the slide within the open slide station. The slide location information may be stored by the system. In one embodiment, the slide location may be selected based on a criteria such as patient case, a physician or hospital, term of storage, etc. When retrieval of the slide is desired, for example where a pathologist instructs the system to perform further imaging of the slide, controller 400 may determine the location information of the desired slide and signal transport module 302 to retrieve the slide from the appropriate slide station within storage module 322.

Figure 9:
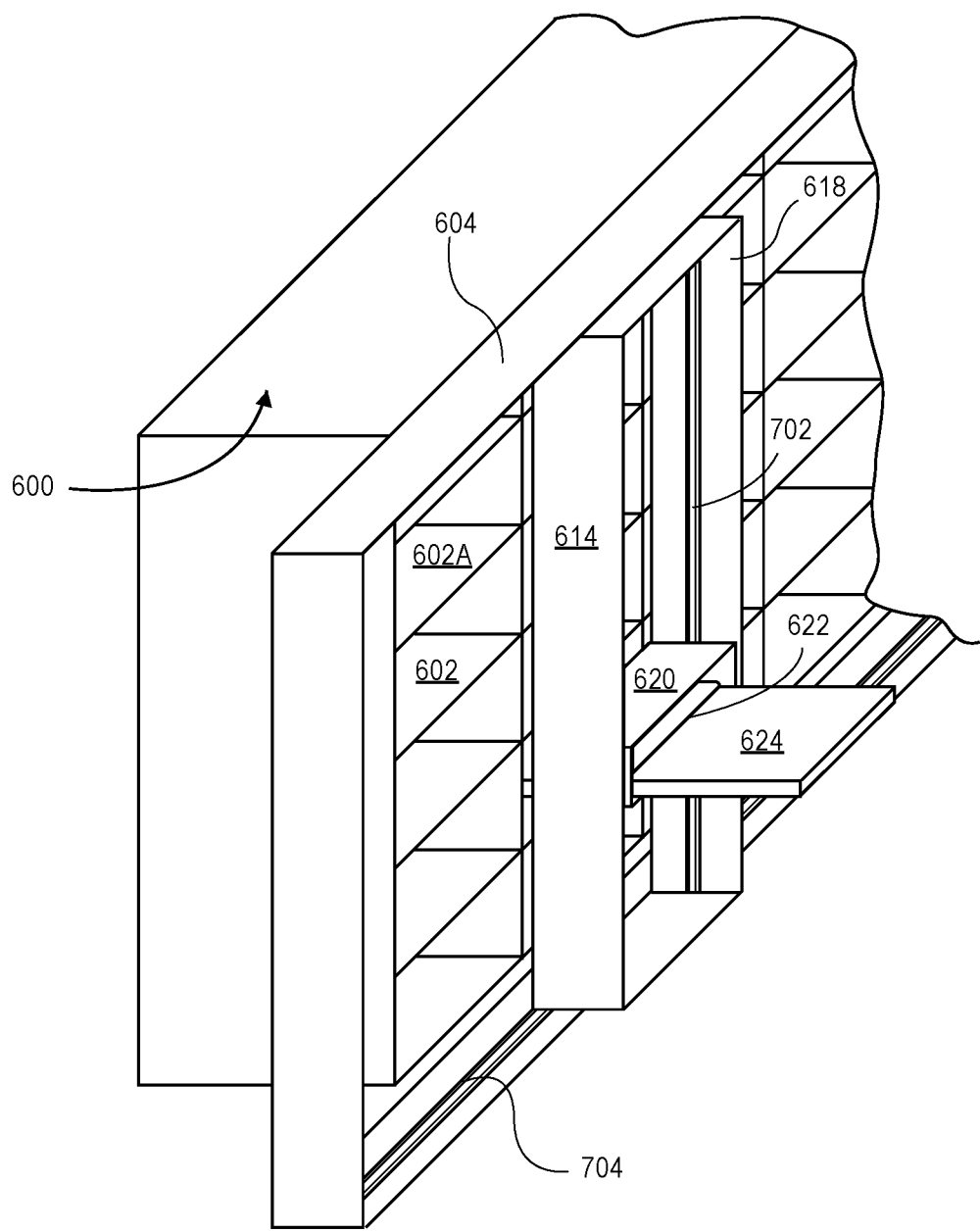
FIG. 9 shows a perspective view of an embodiment of a storage module of the automated system of FIG. 4.

FIG. 9 illustrates a perspective view of the storage module and elevator device of FIG. 8. From the view in FIG. 9, it can be seen that lift member 620 slides vertically along track 702 formed in lift member 620. In this aspect, lift member 620 may have protrusions along its outer surface that line up with and may be engaged within track 702. Similarly, track member 604 includes tracks 704 along which frame member 618 slides.

FIG. 8 and FIG. 9 describe a storage module in connection with storing slides. In another embodiment, a storage module is configured to store slides as well as tissue blocks (e.g., tissue blocks containing an identifier tag). In another embodiment, the system includes storage module 202 for storing slides and a separate storage module for storing tissue blocks. A storage module to store tissue blocks may be configured similar to storage module 322, including an identifier reader, and linked to controller 400. In either configuration, controller 400 is configured to store identification information of the slides and tissue blocks so that a slide(s) may be linked to a tissue block. FIG. 4 shows microtomy module 307 adjacent conveyor 402. Microtomy module may include tissue block processing equipment including a microtome and an identifier reader linked to controller 400. In one embodiment, tissue block may be loaded onto conveyor 402 from microtomy module 307 (or unloaded from conveyor 402 to microtomy module 307) or loaded/unloaded storage module 322 to conveyor 402 or vice versa similar to the methods discussed above for loading/unloading slides.

An automated system for slide transport between processing stations is disclosed. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the invention as well. Representatively, in one embodiment, a "Reflex Staining" procedure may be implemented. In that procedure, the system recommends specific staining and/or testing of biological samples based on pattern recognition reports of an interpretation module. The reflex stainer may include a staining system, imager and interpretation module, which are grouped together and implemented as a single automated instrument. Alternatively, they may be in separate instruments at different locations. Processing may be performed by instruments both inside and outside the reflex stainer, such as for example in grossing, processing and embedding, microtomy and staining and coverslipping.

In some embodiments, the above-described transport module may be implemented in connection with tissue block processing. Representatively, a sample of tissue, which has potentially been grossed and/or fixated in a block of paraffin, may be transported by the transport module between a microtome, imager and storage module. For example, the block having the tissue embedded therein and an identifier may be sectioned by the microtome and then transported to the storage module. If, upon examination of the tissue section, it is determined that another tissue section is needed, a controller may signal the transport module to retrieve the block from the storage module and transport it back to the microtome for additional sectioning.

One or more embodiments of the invention may be provided as a program product or other article of manufacture that may include a machine-readable computer medium having stored thereon one or more instructions. The medium may provide instructions, which, if executed by a machine such as a robot or integration unit, may result in and/or cause the machine to perform one or more of the operations or methods disclosed herein. Suitable machines include, but are not limited to, robots, integration units, computer systems, laboratory equipment, and a wide variety of other machines, to name just a few examples. Representatively, the medium may include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, other types of memory, other machine-readable medium within programmable logic units used to control robots, and combinations thereof.

EXAMPLES

Example 1 is an apparatus including a first imaging module; a second imaging module; a storage module; an automated transport module operable to transport at least one slide between at least one of the first imaging module, the storage module and the second imaging module; and a controller operable to direct transport of the at least one slide by the transport module into the first imaging module and into the second imaging module.

In Example 2, the controller of the apparatus of Example 1 is operable to direct transport of the at least one slide into the first imaging module and then subsequently into the second imaging module.

In Example 3, the controller of the apparatus of Example 1 directs the first imaging module to capture an image of an entire area of a specimen on a slide.

In Example 4, the controller of the apparatus of Example 3 directs the first imaging module to capture an image of a specimen on a slide in a single plane.

In Example 5, the first imaging module of the apparatus of Example 3 is operable to scan an image of a specimen on a slide.

In Example 6, the second imaging module of the apparatus of Example 1 includes a digital microscope.

In Example 7, the second imaging module of the apparatus of Example 1 includes at least one image sensor, a computer operable to direct an image capture by the at least one image sensor of a portion of a microscope slide and a display coupled to the computer and the computer is operable to display the image captured by the at least one sensor.

In Example 8, the computer of the apparatus of Example 7 is operable to display the image captured without saving an image.

In Example 9, the controller of the apparatus of Example 1 is operable to direct transport of the at least one slide by the transport module from the first imaging module to storage.

In Example 10, the controller of the apparatus of Example 9 is operable to direct transport of the at least slide by the transport module from storage to the second imaging module.

Example 11 is a method including transporting at least one slide to a first imaging module using an automated transport module; capturing by the first imaging module of an image of a specimen on the at least one slide; transporting the at least one slide to a storage module using the automated transport module; and transporting the at least one slide to a second imaging module in response to a request for capturing an image in addition to the image captured by the first imaging module.

In Example 12, transporting the at least one slide to a second imaging module of the method of Example 11 includes transporting the at least one slide from the storage module.

In Example 13, capturing by the first imaging module of an image of a specimen on the at least one slide of the method of Example 11 includes capturing an image of an entire area of the specimen.

In Example 14, capturing by the first imaging module of the method of Example 11 includes capturing of an image of a specimen on a slide in a single plane.

In Example 15, capturing by first imaging module of the method of Example 11 includes scanning of an image of a specimen on a slide.

In Example 16, the second imaging module of the method of Example 11 includes a digital microscope.

In Example 17, the second imaging module of the method of Example 11 includes at least one image sensor, a computer operable to direct an image capture by the at least one image sensor of a portion of a microscope slide and a display coupled to the computer and the computer is operable to display the image captured by the at least one sensor.

In Example 18, the computer of the method of Example 17 is operable to display the image captured without saving an image.

In Example 19, the method of Example 11 further includes capturing by the second imaging module of an image of the specimen.

In Example 20, capturing by the second imaging module of an image of the specimen of the method of Example 19 includes transporting the at least one slide to a storage module.

Example 21 is a machine-readable medium including program instructions that when executed by a controller linked to a first imaging module, a storage module, and a second imaging module cause the controller to perform a method including delivering the at least one slide to the first imaging module; capturing by the first imaging module of an image of a specimen on the at least one slide; transporting the at least one slide to a storage; and transporting the at least one slide to a second imaging module in response to a request for capturing an image in addition to the image captured by the first imaging module.

In Example 22, transporting the at least one slide to a second imaging module of the machine-readable medium of Example 21 includes transporting the at least one slide from the storage module.

In Example 23, capturing by the first imaging module of an image of a specimen on the at least one slide of the machine-readable medium of Example 21 includes capturing an image of an entire area of the specimen.

In Example 24, capturing by the first imaging module of the machine-readable medium of Example 21 includes capturing of an image of a specimen on a slide in a single plane.

In Example 25, capturing by first imaging module of the machine-readable medium of Example 21 includes scanning of an image of a specimen on a slide.

In Example 26, the second imaging module of the machine-readable medium of Example 21 includes a digital microscope.

In Example 27, the second imaging module of the machine-readable medium of Example 21 includes at least one image sensor, a computer operable to direct an image capture by the at least one image sensor of a portion of a microscope slide and a display coupled to the computer and the computer is operable to display the image captured by the at least one sensor.

In Example 28, the computer of the machine-readable medium of Example 27 is operable to display the image captured without saving an image.

In Example 29, the program instructions cause the controller to perform a method of the machine-readable medium of Example 27 further includes delivering the at least one slide to a storage module after the image capture at the second imaging module.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

We claim:
1. An apparatus comprising:
a first imaging module comprising one or more scanners;
a second imaging module that is a different type of imaging module than the first imaging module, the second imaging module comprising one or more digital microscopes, with the proviso that, if the second imaging module comprises only one digital microscope, the one digital microscope is operable to contain more than one slide;

a storage module having a plurality of slide stations;
an automated transport module; and
a controller operable to (1) direct transport of a plurality of slides by the transport module individually into the first imaging module, (2) direct one of the one or more scanners of the first imaging module to capture only one image of an area of a specimen on each of the plurality of slides, the one image being in a plane of the specimen directed by a protocol associated with the plurality of slides or selected by a diagnostician responsible for analyzing the plurality of slides, (3) following capture of the one image of the specimen on each of the plurality of slides, direct transport of the plurality of slides to respective ones of the plurality of slide stations in the storage module, (4) determine a location of one of the plurality of slide stations in the storage module containing one slide of the plurality of slides, the one slide being one of a plurality of slides for a patient case, (5) retrieve the one slide of the plurality of slides (6) only in response to a request by a diagnostician or interpretation module for capturing images in addition to the image captured by the first imaging module, determine if one of the one or more microscopes of the second imaging module is available, (7) if a microscope is available, direct transport of the retrieved one slide of the plurality of slides from the storage module into the second imaging module, (8) direct the available microscope of the second imaging module to capture multiple images of a portion of a specimen on the retrieved one slide, wherein the multiple images include images of a portion of the specimen to be taken at different focal distances to provide a z-stack of the portion of the specimen or a composite image of the portion of the specimens with a greater depth of field than the one image in a single plane captured by the first imaging module, (9) retrieve another one slide of the plurality of slides for the patient case from a determined location in the storage module, (10) direct transport of the retrieved another one slide to the second imaging module, (11) direct the available microscope or, where the second imaging module comprises more than one digital microscope, the available microscope or another digital microscope to capture an image of a portion of a specimen on the retrieved another one slide, and (12) display simultaneously at least one image of the multiple images of the portion of the specimen on the retrieved one slide and the image of the portion of the specimen on the retrieved another one slide.

2. The apparatus of claim 1, wherein the controller directs one of the one or more scanners of the first imaging module to capture an image of an entire area of a specimen on a slide.

3. The apparatus of claim 1, wherein the one or more microscopes of the second imaging module comprises at least one image sensor, a computer operable to direct an image capture by the at least one image sensor of a portion of a slide and a display coupled to the computer and the computer is operable to display the image captured by the at least one sensor.

4. The apparatus of claim 3, wherein the computer is operable to display the image captured without saving an image.

5. A method comprising:
transporting a plurality of slides to a first imaging module using an automated transport module, wherein the first imaging module comprises one or more scanners;
individually placing the plurality of slides into the first imaging module when one of the one or more slide scanners is available;
capturing by one of the one or more slide scanners of the first imaging module of only one image of a specimen on each of the plurality of slides;
after capturing by one of the one or more slide scanners of the first imaging module of only one image of a specimen on each of the plurality of slides, transporting the plurality of slides to a storage module using the automated transport module;
identifying a location of one of the plurality of slides in the storage module, the identified one slide being one of a plurality of slides for a patient case;
wherein a second imaging module comprises one or more microscopes, determining if one of the one or more microscopes of the second imaging module is available;
if one of the one or more microscopes of the second imaging module is available, transporting the identified one slide from the storage module to the second imaging module only in response to a request for capturing images in addition to the one image of the specimen on the identified one slide captured by the first imaging module;
capturing by the available microscope of the second imaging module of multiple images of the specimen on the identified one slide, wherein the multiple images include images of a portion of the specimen to be taken at different focal distances to provide a z-stack of the portion of the specimen or a composite image of the portion of the specimens with a greater depth of field than the one image in a single plane captured by the first imaging module;
retrieving another one slide of the plurality of slides for the patient case from a location in the storage module;
transporting of the retrieved another one slide to the second imaging module;
capturing by the second imaging module of an image of a portion of a specimen on the retrieved another one slide, and
simultaneously displaying at least one image of the multiple images of the portion of the specimen on the identified one slide and the image of the portion of the specimen on the retrieved another one slide.

6. The method of claim 5, wherein capturing by the first imaging module of an image of a specimen on the at least one slide each of the plurality of slides comprises capturing an image of an entire area of the specimen.

7. The method of claim 5, wherein capturing by one of the scanners of the first imaging module comprises capturing of an image of a specimen on a slide in a single plane.

8. The method of claim 5, wherein the one or more microscopes of the second imaging module comprises at least one image sensor, a computer operable to direct an image capture by the at least one image sensor of a portion of a slide and a display coupled to the computer and the computer is operable to display the image captured by the at least one sensor.

9. The method of claim 8, wherein the computer is operable to display the image captured without saving an image.

10. The method of claim 5, wherein after capturing by the one or more microscopes of the second imaging module of an image of the specimen, transporting the identified one slide to the storage module.

11. A machine-readable medium including non-transitory program instructions that when executed by a controller linked to a first imaging module, a storage module, and a second imaging module cause the controller to perform a method comprising:

delivering one slide of a plurality of slides to the first imaging module, wherein the first imaging module comprises a one or more scanners;

capturing by one of the one or more scanners of the first imaging module of only one image of a specimen on the slide;

transporting the slide to the storage module;

repeating the delivering into the first imaging module, capturing of one image of a specimen by one of the one or more scanners of the first imaging module and transporting to the storage module for each of the other of the plurality of slides;

identifying a location of the one of the plurality of slides in the storage module, the identified one slide being one of a plurality of slides for a patient case;

transporting the identified one slide to the second imaging module only in response to a request for capturing images in addition to the only one image captured by one of the one or more scanners of the first imaging module, wherein the second imaging module comprises one or more digital microscopes;

capturing by the second imaging module of multiple images of the specimen on the identified one slide, wherein the multiple images include images of a portion of the specimen to be taken at different focal distances to provide a z-stack of the portion of the specimen or a composite image of the portion of the specimens with a greater depth of field than the one image in a single plane captured by the first imaging module;

retrieving another one slide of the plurality of slides for the patient case from a location in the storage module;

transporting of the retrieved another one slide to the second imaging module;

capturing by the second imaging module of an image of a portion of a specimen on the retrieved another one slide, and simultaneously displaying at least one image of the multiple images of the portion of the specimen on the identified one slide and the image of the portion of the specimen on the retrieved another one slide.

12. The machine-readable medium of claim 11, wherein capturing by the one of the one or more scanners of the first imaging module of an image of a specimen on the at least one slide comprises capturing an image of an entire area of the specimen.

13. The machine-readable medium of claim 11, wherein capturing by the one of the one or more scanners of the first imaging module comprises capturing of an image of a specimen on a slide in a single plane.

14. The machine-readable medium of claim 11, wherein the one or more digital microscopes of the second imaging module comprises at least one image sensor, a computer operable to direct an image capture by the at least one image sensor of a portion of a slide and a display coupled to the computer and the computer is operable to display the image captured by the at least one sensor.

15. The machine-readable medium of claim 14, wherein the computer is operable to display the image captured without saving an image.

16. The machine-readable medium of claim 14, wherein the program instructions cause the controller to perform a method further comprising delivering the identified one slide to a storage module after the image capture at the second imaging module.

* * * * *